US012718111B2

(12) United States Patent
Guim Bernat et al.

(10) Patent No.: US 12,718,111 B2
(45) **Date of Patent: *Aug. 25, 2026**

(54) ARTIFICIAL INTELLIGENCE INFERENCE ARCHITECTURE WITH HARDWARE ACCELERATION

(71) Applicant: Intel Corporation, Santa Clara, CA (US)

(72) Inventors: Francesc Guim Bernat, Barcelona (ES); Ned M. Smith, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 249 days.

This patent is subject to a terminal disclaimer.

(21) Appl. No.: 17/752,138

(22) Filed: May 24, 2022

(65) Prior Publication Data

US 2022/0358370 A1 Nov. 10, 2022

Related U.S. Application Data

(63) Continuation of application No. 16/235,100, filed on Dec. 28, 2018, now Pat. No. 11,373,099.

(51) Int. Cl.

*G06N 3/10* (2006.01)
*H04L 41/16* (2022.01)
*H04L 41/5003* (2022.01)

(52) U.S. Cl.

CPC ............... *G06N 3/10* (2013.01); *H04L 41/16* (2013.01); *H04L 41/5003* (2013.01)

(58) Field of Classification Search

CPC ............................ H04L 41/16; H04L 41/5003
USPC ............................................................ 709/16
See application file for complete search history.

(56) References Cited

U.S. PATENT DOCUMENTS

| | | | | |
|---|---|---|---|---|
| 10,542,586 | B2 | 1/2020 | Kondapalli et al. | |
| 11,068,667 | B2 * | 7/2021 | Choi | G06N 3/084 |
| 11,373,099 | B2 | 6/2022 | Guim Bernat et al. | |
| 11,379,860 | B2 * | 7/2022 | Pathare | G06Q 30/0242 |
| 2017/0116004 | A1 * | 4/2017 | Devegowda | G06F 9/44505 |
| 2018/0287903 | A1 * | 10/2018 | Joshi | H04L 43/062 |
| 2018/0307945 | A1 * | 10/2018 | Haigh | G06N 3/063 |

(Continued)

OTHER PUBLICATIONS

U.S. Appl. No. 16/235,100, U.S. Pat. No 11,373,099, filed Dec. 28, 2018, Artificial Intelligence Interference Architechture With Hardware Acceleration.

(Continued)

*Primary Examiner* — Adnan M Mirza
(74) *Attorney, Agent, or Firm* — Essential Patents Group, LLP; Christopher K. Gagne

(57) ABSTRACT

Various systems and methods of artificial intelligence (AI) processing using hardware acceleration within edge computing settings are described herein. In an example, processing performed at an edge computing device includes: obtaining a request for an AI operation using an AI model; identifying, based on the request, an AI hardware platform for execution of an instance of the AI model; and causing execution of the AI model instance using the AI hardware platform. Further operations to analyze input data, perform an inference operation with the AI model, and coordinate selection and operation of the hardware platform for execution of the AI model, is also described.

23 Claims, 15 Drawing Sheets

(56) References Cited

U.S. PATENT DOCUMENTS

| | | | | |
|---|---|---|---|---|
| 2019/0042955 | A1* | 2/2019 | Cahill | G06N 5/04 |
| 2019/0138908 | A1 | 5/2019 | Bernat et al. | |
| 2019/0325304 | A1* | 10/2019 | Gottin | G06N 3/045 |
| 2021/0081763 | A1* | 3/2021 | Abdelfattah | G06N 3/082 |

OTHER PUBLICATIONS

"U.S. Appl. No. 16/235,100, Non Final Office Action dated Apr. 21, 2021", 7 pgs.
"U.S. Appl. No. 16/235,100, Response filed Jul. 21, 2021 to Non Final Office Action dated Apr. 21, 2021", 10 pgs.
"U.S. Appl. No. 16/235,100, Final Office Action dated Sep. 21, 2021", 8 pgs.
"U.S. Appl. No. 16/235,100, Response filed Dec. 10, 2021 to Final Office Action dated Sep. 21, 2021", 12 pgs.
"U.S. Appl. No. 16/235,100, Advisory Action dated Dec. 16, 2021", 2 pgs.
"U.S. Appl. No. 16/235,100, Notice of Allowance dated Feb. 23, 2022", 7 pgs.

* cited by examiner

ARTIFICIAL INTELLIGENCE INFERENCE ARCHITECTURE WITH HARDWARE ACCELERATION

This application is a continuation of U.S. patent application Ser. No. 16/235,100, filed Dec. 28, 2018, now issued as U.S. Pat. No. 11,373,099, which is incorporated herein by reference in its entirety.

TECHNICAL FIELD

Embodiments described herein generally relate to managed computing resources and distributed device networks, and in particular, to techniques for conducting artificial intelligence (AI) processing operations implementing processing in edge computing deployments, including with the use of specialized hardware deployments including hardware accelerators.

BACKGROUND

Edge computing is an emerging paradigm where computing is performed at the "edge", i.e., closer to base stations/network routers and devices producing the data. For example, edge gateway servers are equipped with pools of memory and storage resources in order to be able to perform computation in real time, for low latency requirements such as autonomous driving, video surveillance for threat detection, augmented or virtual reality data processing, etc. The deployment of such edge computing resources is often referred to as the "edge cloud", as cloud-like resources are exposed to the edge (endpoint) devices of a network.

Edge computing offers many general advantages over traditional Internet-based data services, including the ability to serve and respond to multiple applications (object tracking, video surveillance, connected cars, etc.) in real time, and the ability to meet ultra-low latency requirements for these applications. These advantages enable a whole new class of applications, including virtualized network functions, which cannot leverage conventional cloud computing due to latency and networking requirements. However, existing deployments of edge computing has encountered some limitations, often involving resource allocation because the edge is resource constrained and as many deployments place is pressure on usage of edge resources (e.g., the pooling of memory and storage resources). Additionally, edge computing nodes are often power constrained and therefore the power usage needs to be accounted for by the applications that are consuming the most power. Finally, there is an inherent power/performance tradeoff in the use of pooled memory and processing resources which may hold back some types of applications. As a complication, many proposed deployments are likely to use emerging memory technologies, where more power results in more memory bandwidth.

Limited approaches have been developed in conventional cloud processing settings to enable the use of artificial intelligence (AI) models and perform useful functions with such models, such as inferencing, classification, and the like. Although such models present high potential for use in low latency in edge computing scenarios—especially with the deployment of specialized hardware located close to edge devices—existing deployments of AI model technologies have not explored the full capabilities of AI functions. As a result, many proposed deployments of AI inferencing models for the edge cloud provide only limited improvements over network cloud-based deployments.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
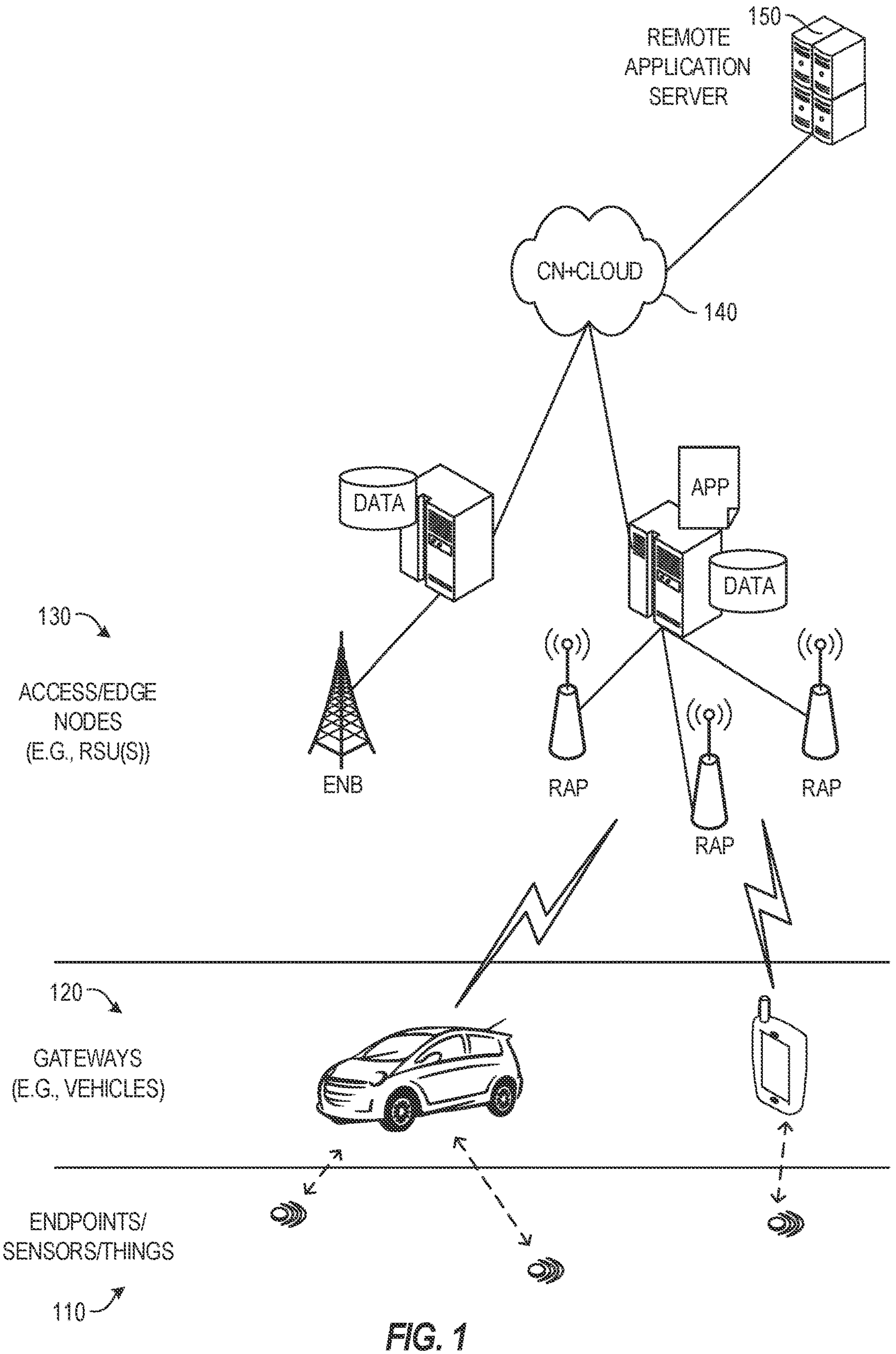
FIG. 1 illustrates devices and network entities in a dynamic communications environment, according to an example.

In the following description, methods, configurations, and related apparatuses are disclosed for deploying and operating artificial intelligence (AI) services within distributed computing resources, such as edge computing nodes and edge cloud networks. The approaches discussed herein provide a versatile approach for processing AI inferencing requests and matching such requests to specialized hardware platforms and configurations at an edge of a network topology. Such inferencing requests may arrive at high speeds for immediate processing, and such requests may require hardware resources to be quickly initialized and used. The present techniques address these and other technical challenges and constraints, while establishing a technical configuration and set of operations for utilizing and performing dynamic functionality for AI inferences.

The systems and methods, discussed herein, include aspects of a headless aggregation AI configuration for edge architectures, which enables connected edge (endpoint) devices to access inferencing capabilities on edge computing hardware through the use of an AI model description. This configuration enables a seamless access to the various forms of AI hardware schemes and capabilities that are hosted at respective edge locations. As a further enhancement to enable low latency operations, the configuration implements logic for handling AI model generation, request scheduling, and inferencing processing, including in scenarios without use of any software intervention.

The high-level functional configurations discussed herein include the configuration of an edge gateway device that is adapted to perform AI processing for initiating and utilizing AI operations. In an example, this edge gateway device is adapted for use with the following processing sequence: first, the gateway receives the model to be inferenced or its description; second, the gateway selects the best hardware to run the inferencing request based on a service level agreement (SLA) or other operational considerations or constraints; third, the gateway creates the corresponding inferencing model instance if description is provided (e.g., to create an inference model instance of a deep neural network (DNN) with a given structure and weights, if specified); and fourth, the gateway registers the model to the corresponding hardware (e.g., specialized accelerators such as Field Programmable Gate Arrays (FPGAs), neural network accelerators or compute chips, etc.) which performs the inference using the model, and returns a relevant result or processing data.

In the following examples, an edge computing gateway may expose various types of interfaces and perform logic functions to accomplish AI processing. This may include: interfaces provided to tenants to register specific implementations of AI Inferencing models identified by UUID; interfaces to edge devices to require the execution of a particular Inferencing model within a particular deadline and maximum cost (in terms of time, monetary cost, resources, etc.); and interfaces to enable an operator to register what accelerators are exposed and their corresponding cost. Further, the respective interfaces and functions may include or expose security features for the platform, such as isolation capabilities to isolate tenant AI workload, training input, and other AI inputs and AI workload outputs.

As also discussed in the following examples, the edge computing gateway may implement various forms of logic to process inference requests and information communicated via these interfaces. Such logic may include: logic to generate an inference binary (or other executable/parseable format) based on a description (i.e., to produce a neural network); logic to select hardware accelerators based on cost, SLA, QoS, load balancing, or other operational considerations; logic to register and use an inference binary, via a target accelerator hardware; and logic to, based on set of inputs and operational parameters, use the target accelerator hardware and return the response to the client. Other edge computing components or entities, such as at a base station or central office, may also be utilized in this scenario to provide storage elements, partitioned and sized by tenant, that track identifiers, descriptions, and mappings of the AI model (e.g., layers, weights, connections of a neural network, etc.)

Existing implementations typically have limited methods of exposing access to AI functions and other types of acceleration capabilities via platforms, often through a set of compute platforms and corresponding software stacks (operating systems, orchestrators, drivers, etc.). The main drawback of these implementations, however, includes a lack of automation and seamless low latency access to different acceleration capabilities, and the use of complex software stacks that add latencies and reduce system utilization. Additionally, although many edge computing architectures are flexible and adaptable (and can utilize many forms of software stacks), many general-purpose computing configurations in edge computing systems cannot process requests in sub-millisecond response time, or utilize resources for management instead of computation (leading to a higher total cost of ownership (TCO)). The introduction and integration of AI use cases introduces an Ultra-low latency AI inferencing edge solution, with a seamless access to AI Inferencing Acceleration hardware on edge computing platforms, configured with relevant descriptions and models. This results in an improved system TCO by using processing resources (e.g., CPUs) only for edge processing requests, and not incurring processing overhead for a system software stack to manage AI inferencing requests.

Demand is steadily growing for the use of hardware-accelerated AI algorithms for computing on-demand (and often, very high-speed) inferences, for both edge computing and wide area network deployments. In this context, the presently disclosed systems may provide AI inference services and functionality to a variety of edge devices, including those in edge computing, Fog, and IoT network settings, with mobility or fixed device scenarios. The presently disclosed systems may also integrate with dynamic deployments of AI such as in AI as a Service (AIaaS) settings. The present configurations thus result in a number of technical benefits, including the selection of appropriate processing and network resources, the distribution of processing operations towards edge devices, and the reduction of unnecessary or improper resource usage. These and other benefits of the presently disclosed approaches within distributed network implementations and similar IoT network settings will be apparent from the following disclosure.

As an overview, the problems addressed and the solutions disclosed are applicable to various types of mobility and mobile device networking implementations (including those applicable to mobile Edge, Fog, and IoT computing scenarios, and in scenarios where such mobile devices operate at fixed locations for periods of time). These may benefit a variety of use cases involving user equipment (UE) in mobile network communications, and in particular, in automotive use cases termed as V2X (vehicle-to-everything), vehicle-to-vehicle (V2V), and vehicle-to-infrastructure (V2I). As with typical edge computing installations, the goal with the present configuration is to bring application endpoints and services (e.g., AI applications and services) as close to the endpoints (e.g., vehicles, mobile devices), as possible, and improve the performance of computing and network resources to enable low latency or high bandwidth services. The present techniques thus may be considered as helping ensure the reliability and availability of services, and the efficient usage of computing resources in a variety of forms, at both requesting, serving, and intermediate devices.

The following systems and techniques may be implemented in, or augment, a variety of distributed, virtualized, or managed environments. These include environments in which network services are implemented using Multi-Access Edge Computing (MEC) platforms, network function virtualization (NFV), or fully virtualized 4G/5G network configurations. Additionally, network connectivity may be provided by LTE, 5G, eNBs, gNBs, or like radio access network concepts, but it is intended that the present techniques may be utilized regardless the type of access network deployed. Further, although many of the following examples are provided with reference to MEC and IoT network settings, it will be understood that the present configurations and techniques are more broadly applicable to Edge computing settings that do not involve MEC or IoT deployments.

FIG. 1 illustrates devices and network entities in a multi-access communications environment, in a use case applicable to the present AI processing techniques. FIG. 1 specifically illustrates the different layers of communication occurring within the environment, starting from endpoint sensors or things 110 (e.g., operating in an IoT network topology); increasing in sophistication to gateways (e.g., vehicles) or intermediate nodes 120, which facilitate the collection and processing of data from endpoints 110; increasing in processing and connectivity sophistication to access or edge nodes 130 (e.g., road-side units operating as edge computing nodes), such as may be embodied by base stations (eNBs), roadside access points (RAPs) or roadside units (RSUs), nodes, or servers; and increasing in connectivity and processing sophistication to a core network or cloud setting 140. The AI processing techniques discussed herein may, in many examples, be implemented among hardware of the edge nodes 130. However, processing operations at the edge nodes 130, or the core network or cloud setting 140, may be enhanced by network services as performed by a remote application server 150 or other cloud services.

As shown, in the scenario of FIG. 1, the endpoints 110 communicate various types of information to the gateways or intermediate nodes 120; however, due to the mobility of the gateways or intermediate nodes 120 (such as in a vehicle or mobile computing device) this results in multiple access points or types of access points being used for network access, multiple distinct services and servers being used for computing operations, multiple distinct applications and data being available for processing, and multiple distinct network operations being offered as the characteristics and capabilities of the available network services and network pathways change. Because the operational environment may involve aspects of V2X, V2V, and V2I services from vehicle user equipment (vUE) or human-operated portable UEs (e.g., mobile smartphones and computing devices), significant complexity exists for coordinating for computing services and network usage.

Figure 2:
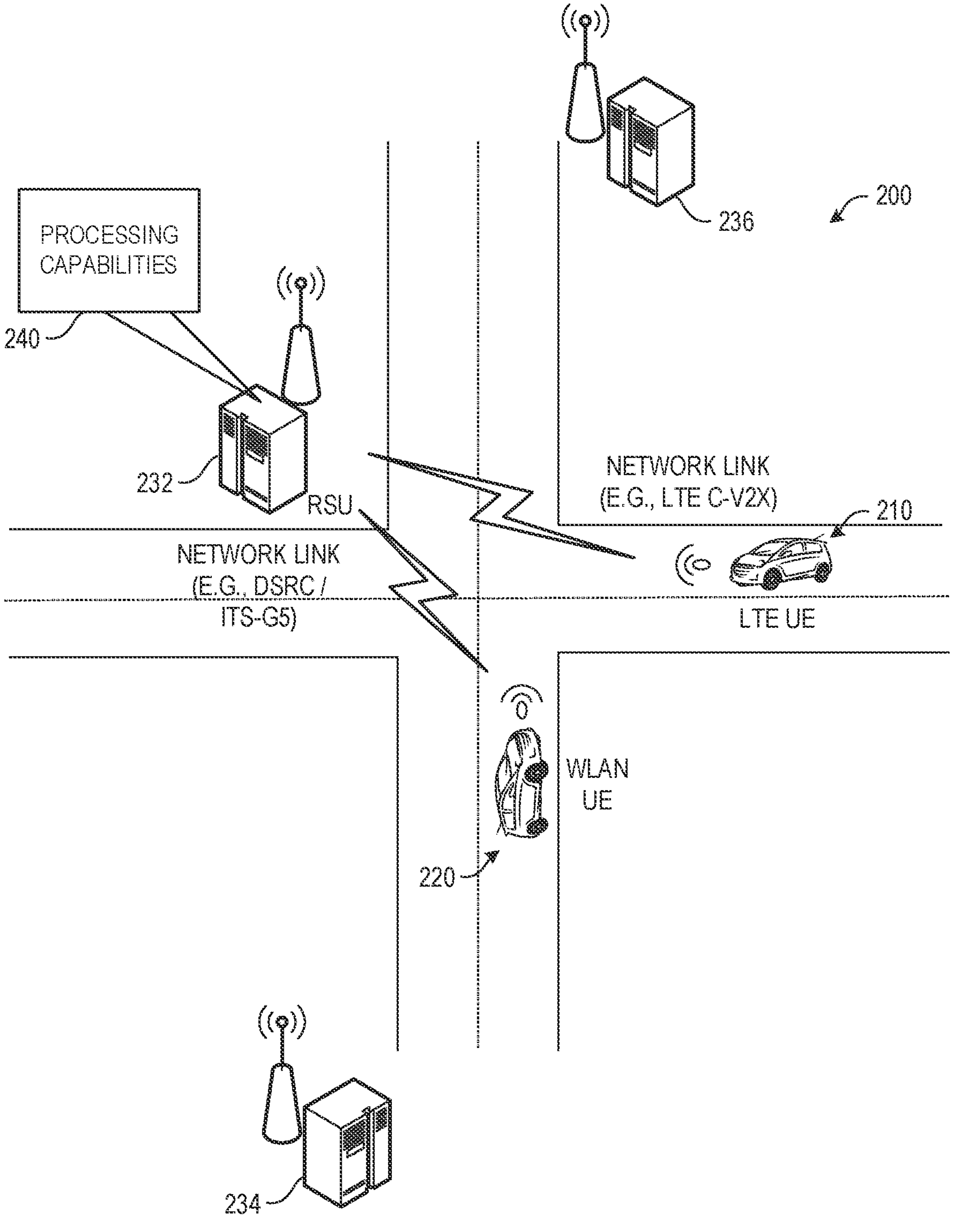
FIG. 2 illustrates an operative arrangement of network and mobile user equipment, according to an example.
Figure 3:
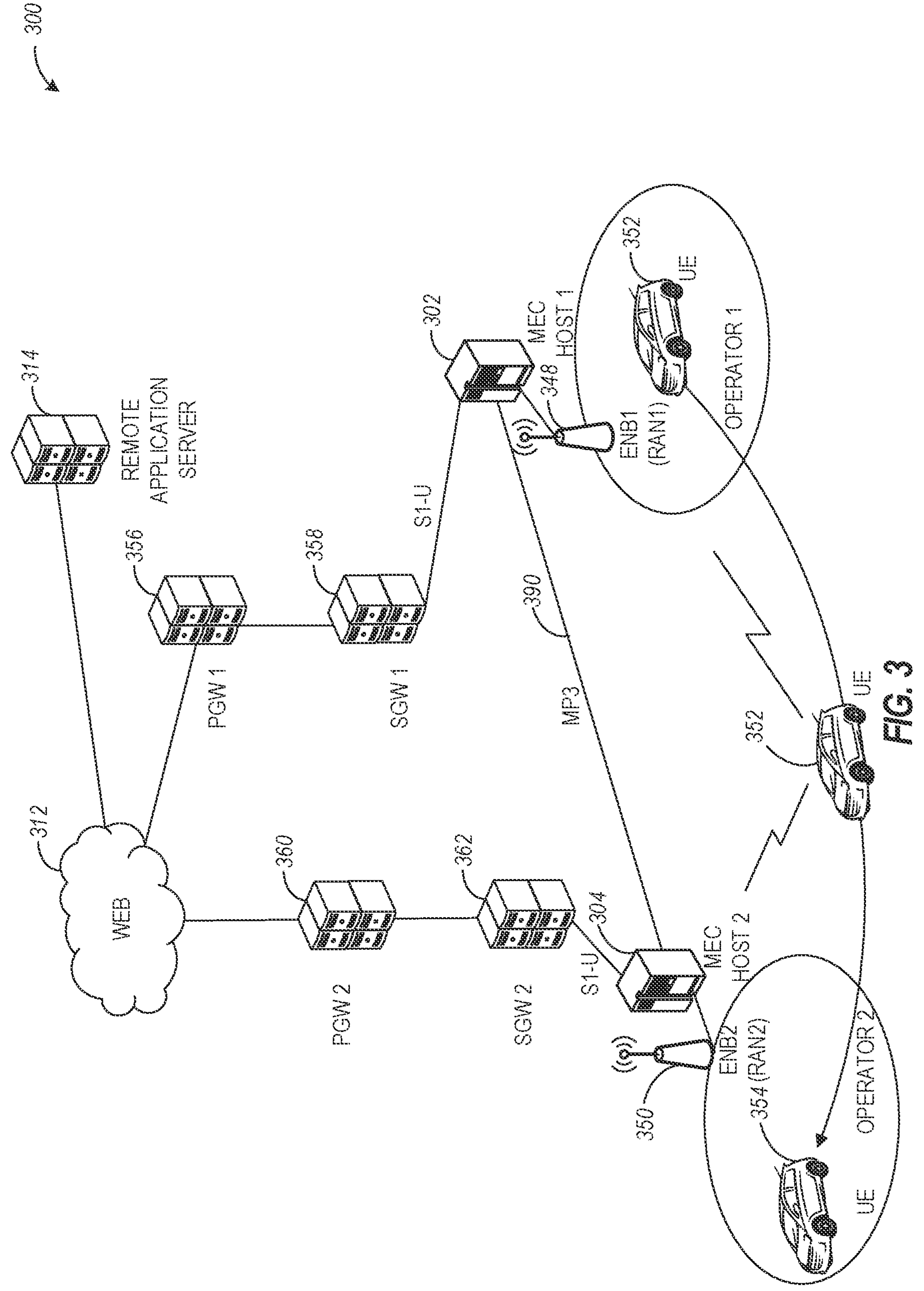
FIG. 3 illustrates a communication infrastructure with multiple multi-access edge computing (MEC) hosts and core networks, according to an example.

FIG. 2 illustrates an operative arrangement 200 of network and vehicle user equipment, in which various embodiments may be practiced. In arrangement 200, vUEs 210, 220 may operate with a defined communication system (e.g., using a LTE C-V2X WWAN, or a SRC/ETSI ITS-G5 (WLAN) communication network, etc.). In embodiments, a Road Side Unit (RSU) 232 may provide processing services 240 by which the vUEs 210 and 220 may communicate with one another (or to other services), execute services individually and with each other, or access similar aspects of coordinated or device-specific edge computing services. In embodiments, the processing services 240 (e.g., the AI inferencing services discussed herein) may be provided or coordinated by a MEC host (e.g., an ETSI MEC host), MEC platform, or other MEC entity implemented in or by hardware of the RSU 232. In this example, the RSU 232 may be a stationary RSU, such as an eNB-type RSU or other like infrastructure. In other embodiments, the RSU 232 may be a mobile RSU or a UE-type RSU, which may be implemented by a vehicle (e.g., a truck), pedestrian, or some other device with such capabilities. In these cases, mobility issues can be managed in order to ensure a proper radio coverage of the applicable services. For instance, mobility may be managed as the respective vUEs 220, 210 transition from, and to, operation at other RSUs, such as RSUs 234, 236, and other network nodes not shown. 100341 FIG. 3 depicts illustrates a multi-access V2X communication infrastructure 300 with separate core networks and separate MEC hosts coupled to corresponding radio access networks, according to an example. In the C-V2X communication infrastructure 300 each of the MEC hosts 302 and 304 is coupled to a separate core network. More specifically, MEC host 302 is coupled to a first core network that includes a serving gateway (S-GW or SGW) 358 and a packet data network (PDN) gateway (P-GW or PGW) 356. MEC host 304 is coupled to a second core network that includes SGW 362 and PGW 360. Both core networks may be coupled to the remote application server 314 (e.g., cloud server) via the network 312. As illustrated in FIG. 3, MEC hosts 302 and 304 may be coupled to each other via a MEC-based interface 390, which may include an MP3 interface or another type of interface. Additionally, the MEC hosts 302, 304 may be located on the S1 interfaces of the core networks, downstream between the core network and the corresponding RANs of eNBs 348 and 350. In some aspects and as illustrated in FIG. 3, UEs 352 and 354 may be located within vehicles or other mobile devices. Additional detail on an example MEC system and host implementation is provided in FIG. 11, discussed below. In various examples, the AI processing services discussed herein may be implemented at the hosts 302, 304, the eNBs 348, 350, or like hardware.

Figure 4:
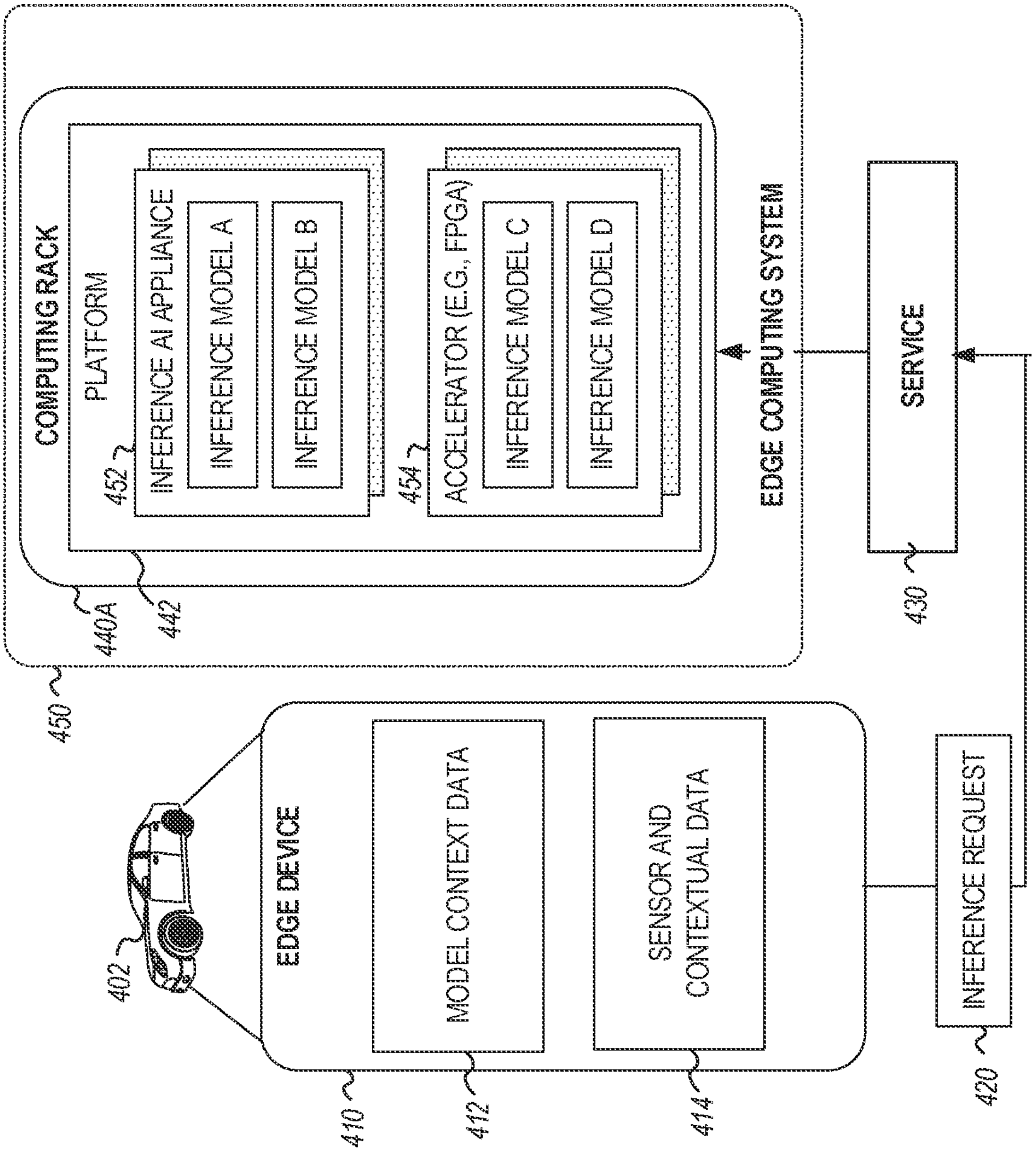
FIG. 4 illustrates a scenario for use of an AI inference service, involving execution of AI inference model operations on an edge computing platform, according to an example.

FIG. 4 depicts an example scenario for use of an AI inference service, as implemented by an execution of AI inference model operations on an edge computing platform. Specifically, the scenario of FIG. 4 depicts an edge device 410 requesting AI inference data from an AI service interface 430 via inference request 420. The AI service interface 430 in turn communicates the request to a computing system 450, which is an edge cloud-based location (e.g., a host in a network provided by an edge computing system) that provides and executes an AI inference model. The flow of AI inference data (e.g., results) from the edge computing system 450 back to the edge device 410 is not shown; however, it will be understood that a variety of use cases involving the communication or use of AI-based inference data (e.g., results) may be provided back to the edge device 410 in this environment.

In an example, the AI inference model is operated or otherwise provided by the computing system 450 in the form of an AI-as-a-service (AIaaS) deployment. In this fashion, specific AI data operations may be requested and offloaded from the edge device 410 to the edge cloud, for performance on demand with an inference model operating on platform hardware 442. However, other examples and uses of an AI inference model may also be provided by the variations of the present architecture and network topology. In particular, the use of the presently described service 430 may enable the performance of AI inference operations within a network fog or distributed collection of edge computing devices, platforms, and systems.

As shown in the example scenario, the edge device 410 is a device that comprises or is embodied in a host system 402 (as depicted, an automobile). The edge device 410 generates model context data 412 and sensor and contextual data 414 for processing by an AI model, such as through the operation of various sensors and data collection components in the edge device 410, the host system 402, or other coupled functionality. The data that the edge device 410 provides, however, is not limited to sensor data; other forms of static and dynamic information (e.g., device characteristics, data generated by software running on the device, user inputs, etc.) may be generated or communicated from the edge device 410. The edge device 410 may be aware of characteristics of the respective models, the types of accelerators available to execute the respective models, identifiers of specific binaries, descriptions of models or model execution objectives, and other service properties.

As also shown in the example scenario of FIG. 4, the data 412, 414 is used to create an inference request 420, which is communicated to the AI service interface 430 for further processing. The inference request 420 may communicate conditions, states, and characteristics of the current operation of the edge device 410, in addition to a specific inference request or task. The inference request 420 may also communication information regarding specific inference service requirements and functions for the edge device 410 or the executable task. As discussed in further detail with reference to FIGS. 5 and 6, below, this inference request 420 may be interpreted and used to invoke particular AI inference model implementations, executed via different types of accelerators and hardware platforms.

A variety of AI data processing use cases that occur at the edge device 410 may be enabled through the functionality discussed herein. Such use cases include, but are not limited to: video analytics (e.g., person or object detection); speech analytics (e.g., speech to text, language processing); vehicle data processing; augmented or virtual reality applications; or the like.

As also shown in the depicted scenario of FIG. 4, different types of accelerator hardware (e.g., an AI appliance 452, a field-programmable gate array (FPGA) 454, a neural processor, an application specific integrated circuit (ASIC), neuromorphic hardware, etc.) may be available to execute respective inference models, or respective implementations, types, or variations of the models. In some examples, execution of a particular model may be performed at more than one appliance or hardware implementation, more than one chassis or rack 440A, or even distributed across different racks or enclosures in independent power domains. The particular platform or accelerator hardware (or combination of hardware) or model to use may be determined with the following approaches.

Figure 5:
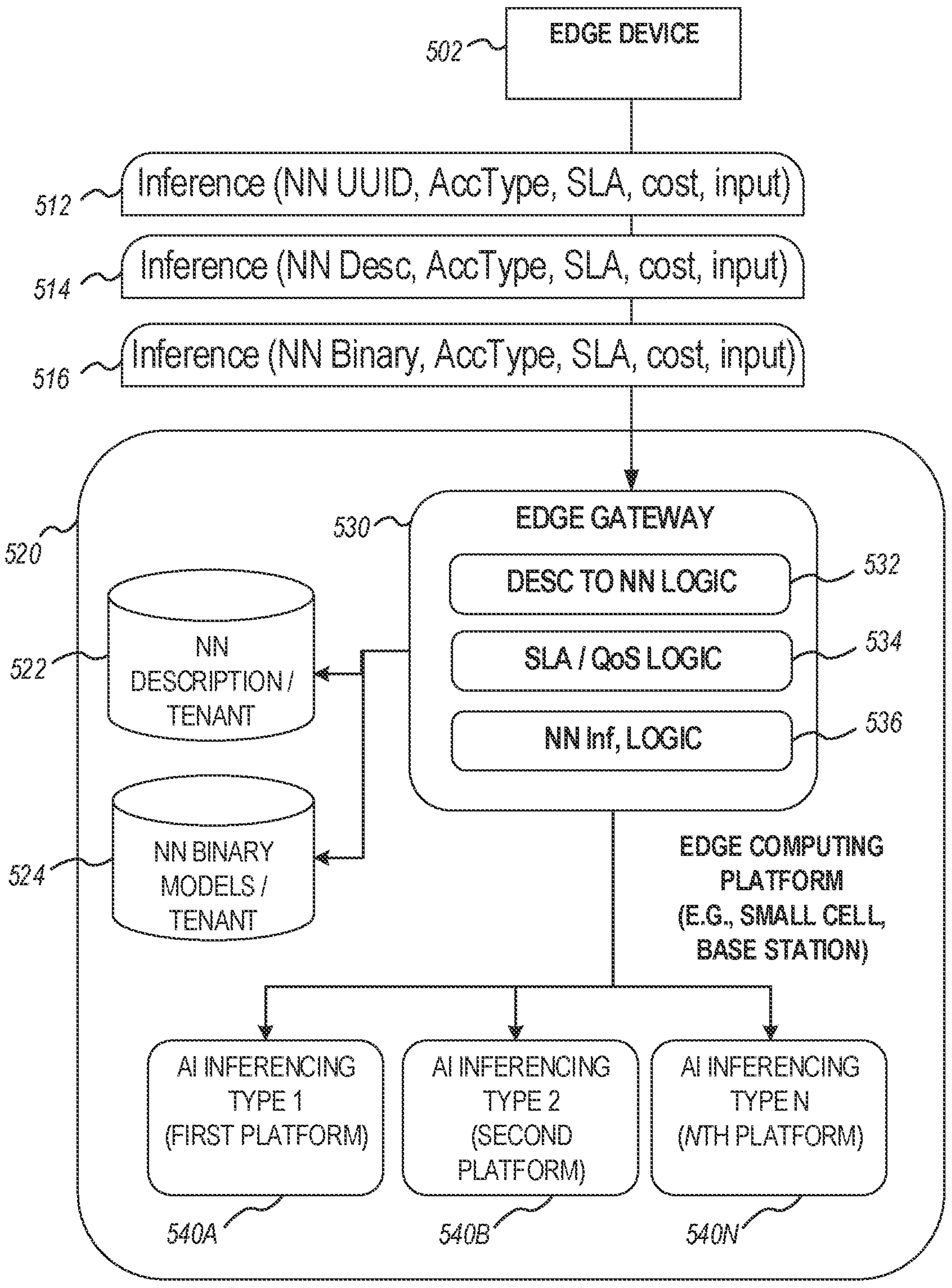
FIG. 5 illustrates a communication and processing scenario for AI inference requests using respective hardware platforms, according to an example.

FIG. 5 illustrates an example communication and processing scenario for AI inference requests, using respective hardware platforms 540, as a further illustration of the scenario introduced in FIG. 4. The functionality of FIG. 5 is specifically illustrated as being implemented in logic (e.g., with programmed software instructions) at an edge gateway 530, which includes logic elements to process received inference information (inference requests), access AI information, and utilize hardware resources. Although the following functionality is depicted and described from the perspective of the edge gateway 530 operating within an edge computing platform 520, it will be understood that additional or fewer entities may be involved to implement the relevant functionality.

In the depicted example, an edge device 502 communicates an inference request in one of three formats (requests 512, 514, 516) although other types of requests or formats may be feasible. A first inference request format 512 specifies the identifier of an AI model (NN UUID—neural network unique identifier), the type of acceleration hardware (AccType), service level agreement (SLA) parameters or identification, cost, and input (e.g., input data to be processed). A second inference request format 514 specifies a description of an AI model (NN Desc), as well as the type of acceleration hardware (AccType), service level agreement (SLA) parameters or identification, cost, and input (e.g., input data to be processed). A third inference request format 516 specifies a binary of the AI model (e.g., an intermediate or executable data form of the AI model) as well as the type of acceleration hardware (AccType), service level agreement (SLA) parameters or identification, cost, and input (e.g., input data to be processed).

The inference request (512, 514, or 516) is received for processing by an edge gateway 530 operating in an edge computing platform 520. The edge gateway 530 includes one or more logic or functional components to process the received inference request, and coordinate execution of the AI model on one or more hardware platforms. As depicted, the edge gateway 530 includes: description to neural network logic 532, which is adapted to receive or identify a description, to identify a relevant neural network or other AI model implementation; SLA and QoS logic 534, which is adapted to receive or consider an SLA, cost, or other input parameters, to perform execution of the AI model implementation according to a SLA or QoS objective; and neural network execution logic 536, adapted to request an inference (e.g., classification, data result, etc.) and coordinate the execution of the identified AI model on a particular hardware platform, according to the SLA or QoS objective. Although this and other examples refer to the execution of a trained artificial neural network model binary to obtain an inference, it will be understood that other forms of AI models (including machine learning) approaches and formats which are not neural networks may be employed; and additionally, results other than inferences (e.g., regression results, mappings, etc.) may also be produced with the execution of AI models.

The logic 532, 534, 536 may perform additional processing as part of identifying an AI model implementation (e.g., binary) for AI model processing operations. This may include use of the logic 532 to identify a description associated with an identifier from an AI description data store 522, use of the logic 532 to lookup a model binary from a model data store 524, or like operations. The data stores 522, 524 may include descriptions, models, or mappings that are specific to an edge computing tenant, user, platform, or the like. In some scenarios, where multiple descriptions or models are identified as available for execution, the logic 534 may be used to identify a particular description or model, or a location for execution of the model, based on SLA or QoS considerations.

The AI model may be executed on one or more hardware platforms, shown in FIG. 5 with a first platform 540A (of a first hardware type), a second platform 540B (of a second hardware type), and an additional platform 540N (of a Nth hardware type). In some examples, the model may be specific for execution on a particular platform type; whereas in other examples, the SLA or QoS logic 534 may be used to select a particular type of inferencing hardware type from among multiple possible platforms for execution. The selection of the particular inferencing hardware thus may be determined as a result of the inference request (512, 514, 516). The respective hardware platforms 540A-N may correspond to different types of accelerator hardware (e.g., AI appliance, a field-programmable gate array (FPGA), a neural processor or neural compute stick, a vision processing unit, a graphics processing unit (GPU) array, an application specific integrated circuit (ASIC), neuromorphic hardware, etc.), different configurations of such hardware, or other variations.

Figure 6:
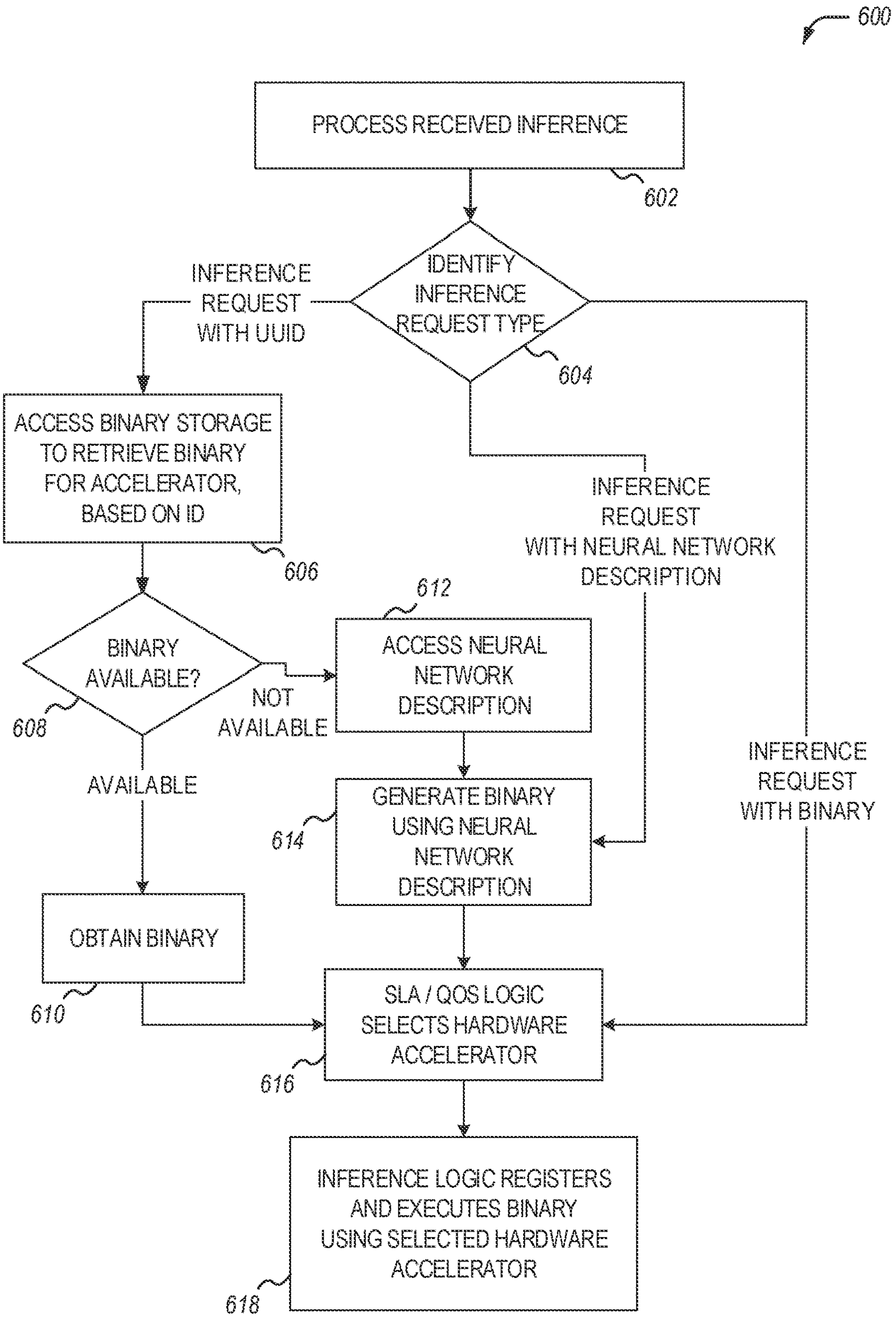
FIG. 6 illustrates an operational flow for processing an AI inference request, according to an example.

FIG. 6 illustrates an operation flow 600 for processing an example AI inference request, commencing at operation 602. The operational flow begins with the identification 604 of an inference request type, with respective operations resulting based on the specification of an UUID in the inference request to obtain or generate a binary (operations 606-612, 616), the specification of a neural network description in the inference request to generate a binary (operation 614, 616), or the specification of a binary in the inference request (operation 616).

The example of an inference request that provides a UUID, results in an access to binary storage (e.g., data store 522) at 606. This data store is accessed to obtain a binary for use with an accelerator, based on identifying information in the request. A determination is performed at 608 to determine whether a binary is or is not available. If available, operations are performed to obtain the relevant binary (or binaries) at 610, and proceed to selection of hardware acceleration usage (discussed below). If not available, a neural network description corresponding to the identifier is obtained at 612. The model binary is generated at 614 using this neural network description, and operations in flow 600 proceed to selection of hardware acceleration usage (discussed below).

The example of an inference request that provides a neural network description, results in the generation of the model binary at 614 using the neural network description. Operations in flow 600 then proceed to selection of hardware acceleration usage (discussed below).

The example of an inference request that provides a specified binary, directly results in operations proceed to selection of hardware acceleration usage. The selection of hardware acceleration usage, at 616, may involve the use of SLA or QoS logic to identify relevant service level and operation considerations, relative to the execution of specific binary operations on hardware.

The operation flow 600 concludes with the use of inference logic, at 618, to register and execute the binary using the selected hardware accelerator. The results may be collected, stored, returned, or further processed, based on the type of inference, the type of request, and other characteristics.

Figure 7:
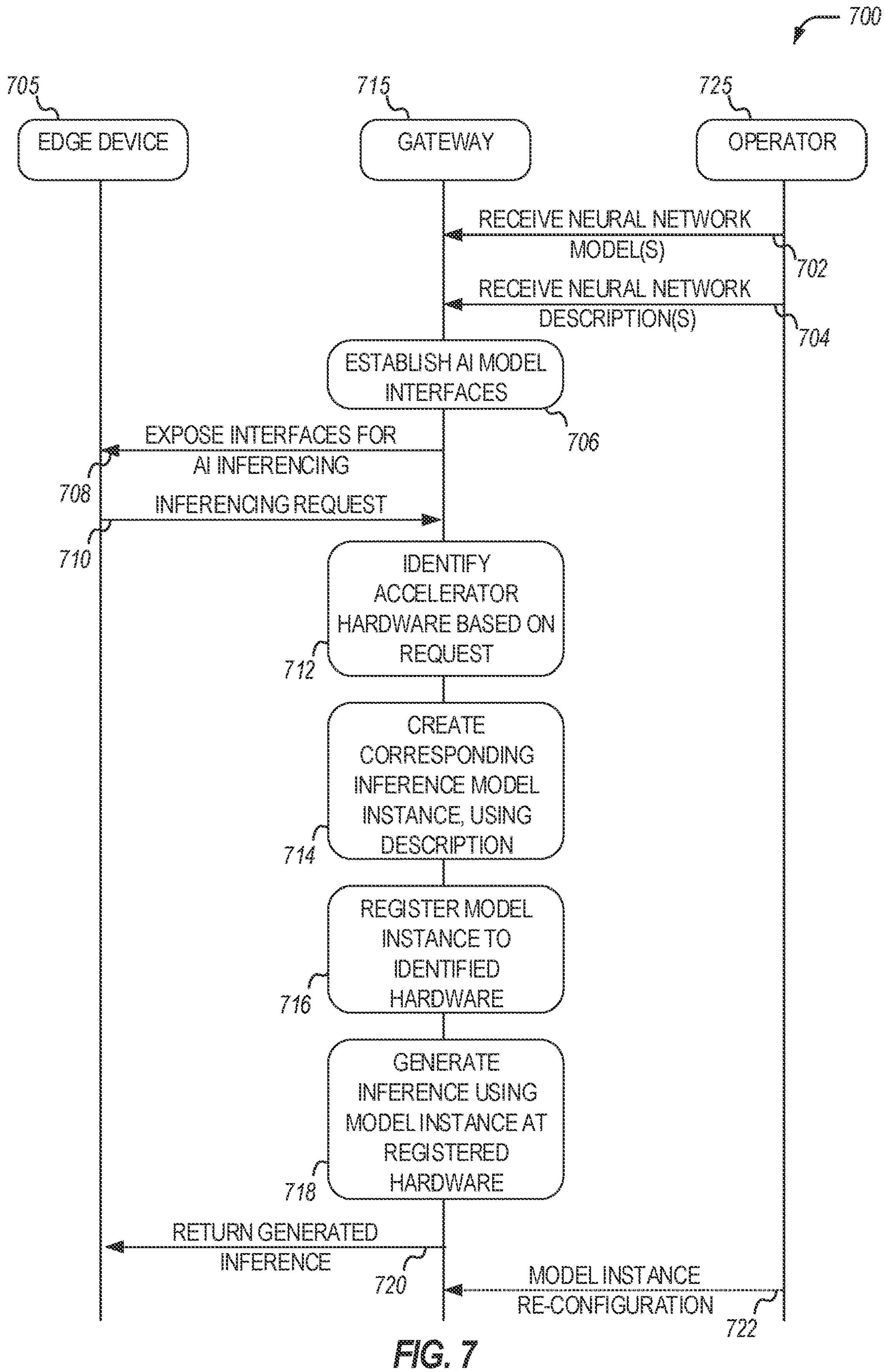
FIG. 7 further illustrates operational flows among an edge device, gateway, and operator, for processing an AI inference request, according to an example.

FIG. 7 further illustrates operational flows 700 among an edge device 705, gateway 715, and operator 725 (e.g., network or service provider), for processing an AI inference request. It will be understood that the flow 700 is intended as an example implementation scenario of the preceding techniques, showing end-to-end communications among respective entities. However, substitute communications and variations to the operations may result in certain operations being consolidated or omitted from the flow 700. Also, although only three entities are depicted, it will be understood that additional entities or entity sub-systems may be involved with implementation of the flow 700.

As depicted, the sequential flow 700 commences with the configuration and receipt of relevant AI models (e.g., neural network models, at 702) and AI model metadata (e.g., neural network model descriptions, at 704) from the operator 725 to the gateway 715. This may also involve the use of data stores and data configurations within other entities accessible to the gateway or operator. At the gateway 715, various interfaces (e.g., APIs, services, applications, etc.) to receive AI inference requests and conduct AI inferencing operations are established at 706, and these interfaces are exposed for use by one or more endpoint devices/clients (e.g., edge device 705) at 708.

The edge device 705 communicates an AI inferencing request at 710, including data for processing and relevant identification of the parameters as specified by the interfaces. Some of the data processing occurring at the gateway 715 in response to the request may include (not necessarily in sequential order): identification of accelerator hardware, at 712, based on the request; creation of an inference model instance, at 714, using a description communicated via the inferencing request; registration of a model instance, at 716, to an identified acceleration hardware platform; and execution of the model with the acceleration hardware, at 718, to generate an inference using the model instance. Based on this data processing, a generated inference or other data result is communicated from the gateway 715 to the edge device 705 at 720. Based on ongoing operations, requests, or network state, various model instances and parameters may optionally be reconfigured by the operator 725 (operation 722).

Figure 8:
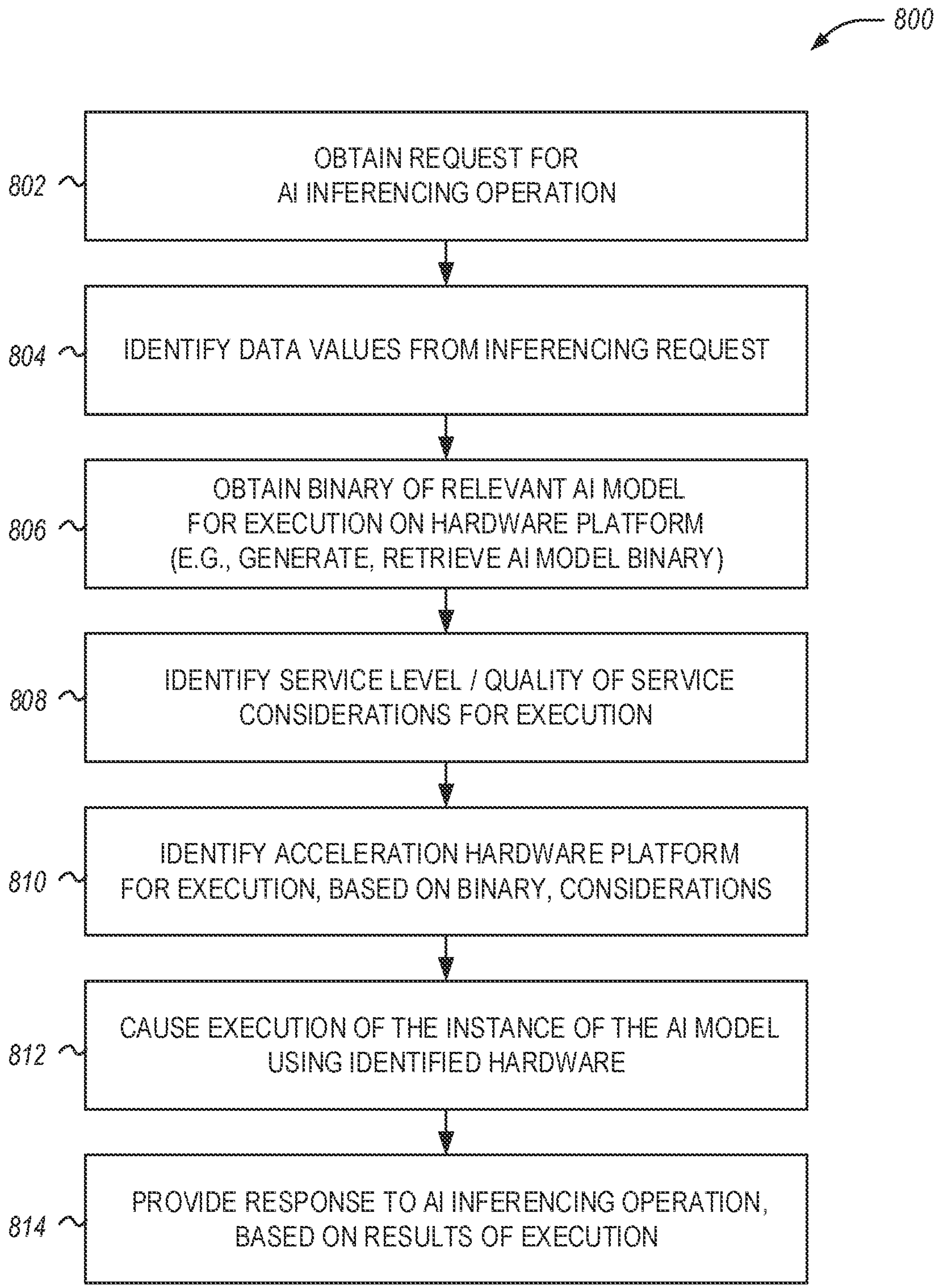
FIG. 8 illustrates a flowchart of a method for AI inference request processing in an edge computing service, according to an example.

FIG. 8 illustrates a flowchart 800 of an example method for implementing and utilizing AI inference request processing in an edge computing environment and operable AI inference service. This flowchart 800 provides a high-level depiction of operations used to obtain, process, and output data, enabling the execution of AI models and AI inferencing actions, from the perspective of an edge computing gateway, switch, or other intermediate computing device. However, it will be understood that additional operations (including the integration of the operations from sequential flow 700 of FIG. 7, or the functionality of the respective processing components as illustrated in FIGS. 4 to 6) may be implemented into the depicted flowchart 800.

In an example, the operations depicted in the flowchart 800 commence at 802 with obtaining (e.g., receiving, processing etc.) a request for an AI inferencing operation, for execution or performance with an AI model, such as from an edge device (e.g., an endpoint, UE, client device, etc.). The operations then proceed at 804 with identifying relevant data values (e.g., an identifier, selection of an SLA, etc.) from the inferencing request. In an example, the request includes input data to be analyzed with the execution of the AI model instance, and data to specify execution of an AI model instance to perform an inference operation (or other AI processing operation) with the AI model on the input data. In a specific example, the request for the AI operation indicates SLA information and cost information for execution of the instance of the AI model. Also in a specific example, the request for the AI operation includes an identifier of the AI model.

The information from the inferencing request is used at 806 to obtain a binary of a relevant AI model, for execution on a specific hardware platform. In an example, the identifier provided in the request is used to obtain the binary from a data store. This operation may also include accessing the data store, to obtain respective binary data for one or more of a plurality of AI models, including a binary used for execution with a specific AI model instance. The information from the inferencing request is also used at 808 to identify a service level, a quality of service, or other considerations, for execution of the AI model. Further, the information from the inferencing request is also used at 810 to identify an acceleration hardware platform for execution, based on the binary, identification information, SLA or cost information, and other considerations.

The operations of the flowchart 800 continue at 812 to cause (e.g., trigger, schedule, communicate, etc.) the execution of the AI model instance on the specific acceleration hardware platform. The operations then conclude at 814 by providing a response to an AI inferencing operation, and return a response based on results of execution. In an example, this may include communicating, to the requesting device (e.g., an edge device), results of the execution produced from the AI model instance. Further processing and use of the AI model instance may also occur according to the operations discussed herein.

The preceding techniques may be adapted for other types of coordinated and managed AI processing functions based on QoS, SLAB, costs, resource availability, in a variety of managed scenarios. Additionally, although the network configurations depicted above were provided in a simplified example of an edge device, gateway, and cloud service, it will be understood that many variations of these configurations may be used with the presently disclosed techniques. Accordingly, the following sections discuss implementation examples of internet-of-things (IoT) network topologies and device communication and operations, which may be used with the presently disclosed AI inference processing techniques.

Figure 9:
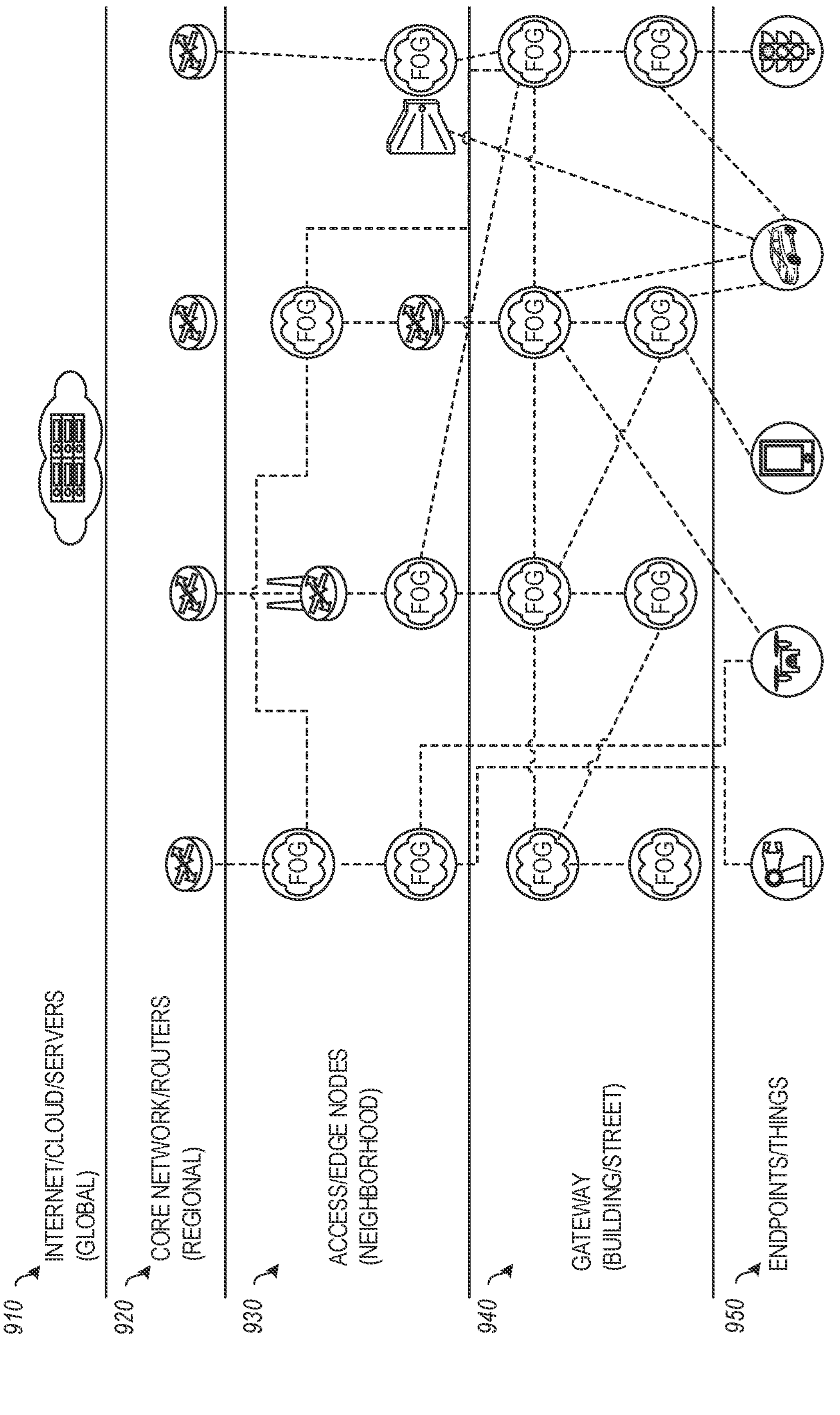
FIG. 9 illustrates a MEC and FOG network topology, according to an example.

FIG. 9 illustrates a MEC and FOG network topology, according to an example. This network topology, which includes a number of conventional networking layers, may be extended through use of the tags and objects discussed herein. Specifically, the relationships between endpoints (at endpoints/things network layer 950), gateways (at gateway layer 940), access or edge computing nodes (e.g., at neighborhood nodes layer 930), core network or routers (e.g., at regional or central office layer 920), may be represented through the use of linked objects and tag properties.

A FOG network (e.g., established at gateway layer 940) may represent a dense geographical distribution of near-user edge devices (e.g., FOG nodes), equipped with storage capabilities (e.g., to avoid the need to store data in cloud data centers), communication capabilities (e.g., rather than routed over the internet backbone), control capabilities, configuration capabilities, measurement and management capabilities (rather than controlled primarily by network gateways such as those in the LTE core network), among others. In this context, FIG. 9 illustrates a general architecture that integrates a number of MEC and FOG nodes—categorized in different layers (based on their position, connectivity and processing capabilities, etc.). It will be understood, however, that such FOG nodes may be replaced or augmented by edge computing processing nodes.

FOG nodes may be categorized depending on the topology and the layer where they are located. In contrast, from a MEC standard perspective, each FOG node may be considered as a mobile edge (ME) Host, or a simple entity hosting a ME app and a light-weighted ME Platform. In an example, a MEC or FOG node may be defined as an application instance, connected to or running on a device (ME Host) that is hosting a ME Platform. Here, the application consumes MEC services and is associated to a ME Host in the system. The nodes may be migrated, associated to different ME Hosts, or consume MEC services from other (e.g., local or remote) ME platforms.

In contrast to this approach, traditional V2V applications are reliant on remote cloud data storage and processing to exchange and coordinate information. A cloud data arrangement allows for long-term data collection and storage, but is not optimal for highly time varying data, such as a collision, traffic light change, etc. and may fail in attempting to meet latency challenges, such as stopping a vehicle when a child runs into the street. The data message translation techniques discussed herein enable direct communication to occur among devices (e.g., vehicles) in a low-latency manner, using features in existing MEC services that provide minimal overhead.

Depending on the real-time requirements in a vehicular communications context, a hierarchical structure of data processing and storage nodes are defined. For example, including local ultra-low-latency processing, regional storage and processing as well as remote cloud data-center based storage and processing. SLAs (service level agreements) and KPIs (key performance indicators) may be used to identify where data is best transferred and where it is processed or stored. This typically depends on the Open Systems Interconnection (OSI) layer dependency of the data. For example, lower layer (PHY, MAC, routing, etc.) data typically changes quickly and is better handled locally in order to meet latency requirements. Higher layer data such as Application Layer data is typically less time critical and may be stored and processed in a remote cloud data-center.

Figure 10:
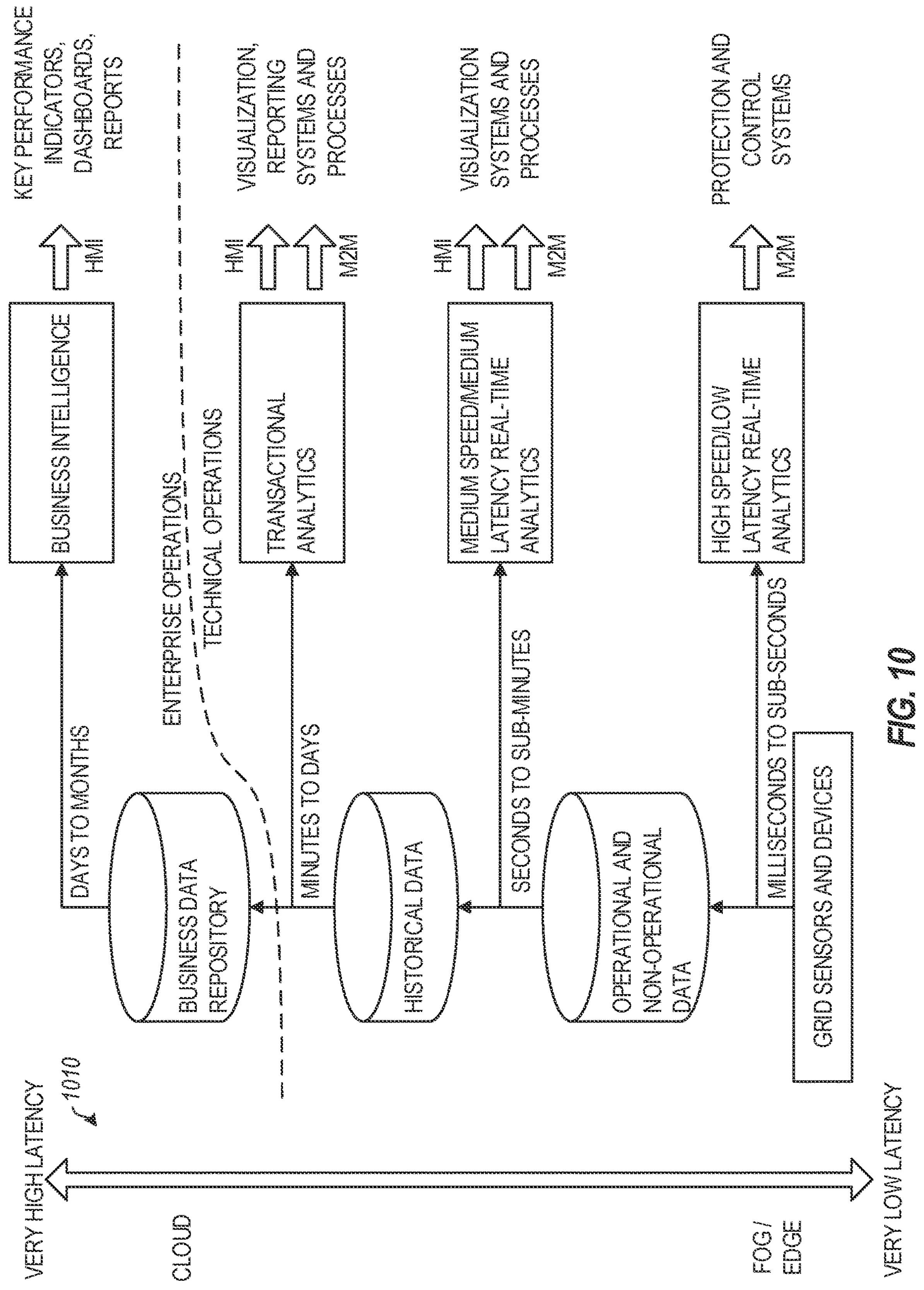
FIG. 10 illustrates processing and storage layers in a MEC and FOG network, according to an example.

FIG. 10 illustrates processing and storage layers in a MEC and FOG network, according to an example. The illustrated data storage or processing hierarchy 1010 relative to the cloud and fog/edge networks allows dynamic reconfiguration of elements to meet latency and data processing parameters.

The lowest hierarchy level is on a vehicle-level. This level stores data on past observations or data obtained from other vehicles. The second hierarchy level is distributed storage across a number of vehicles. This distributed storage may change on short notice depending on vehicle proximity to each other or a target location (e.g., near an accident). The third hierarchy level is in a local anchor point, such as a MEC component, carried by a vehicle in order to coordinate vehicles in a pool of cars. The fourth level of hierarchy is storage shared across MEC components. For example, data is shared between distinct pools of vehicles that are in range of each other.

The fifth level of hierarchy is fixed infrastructure storage, such as in RSUs. This level may aggregate data from entities in hierarchy levels 1-4. The sixth level of hierarchy is storage across fixed infrastructure. This level may, for example, be located in the Core Network of a telecommunications network, or an enterprise cloud. Other types of layers and layer processing may follow from this example.

Figure 11:
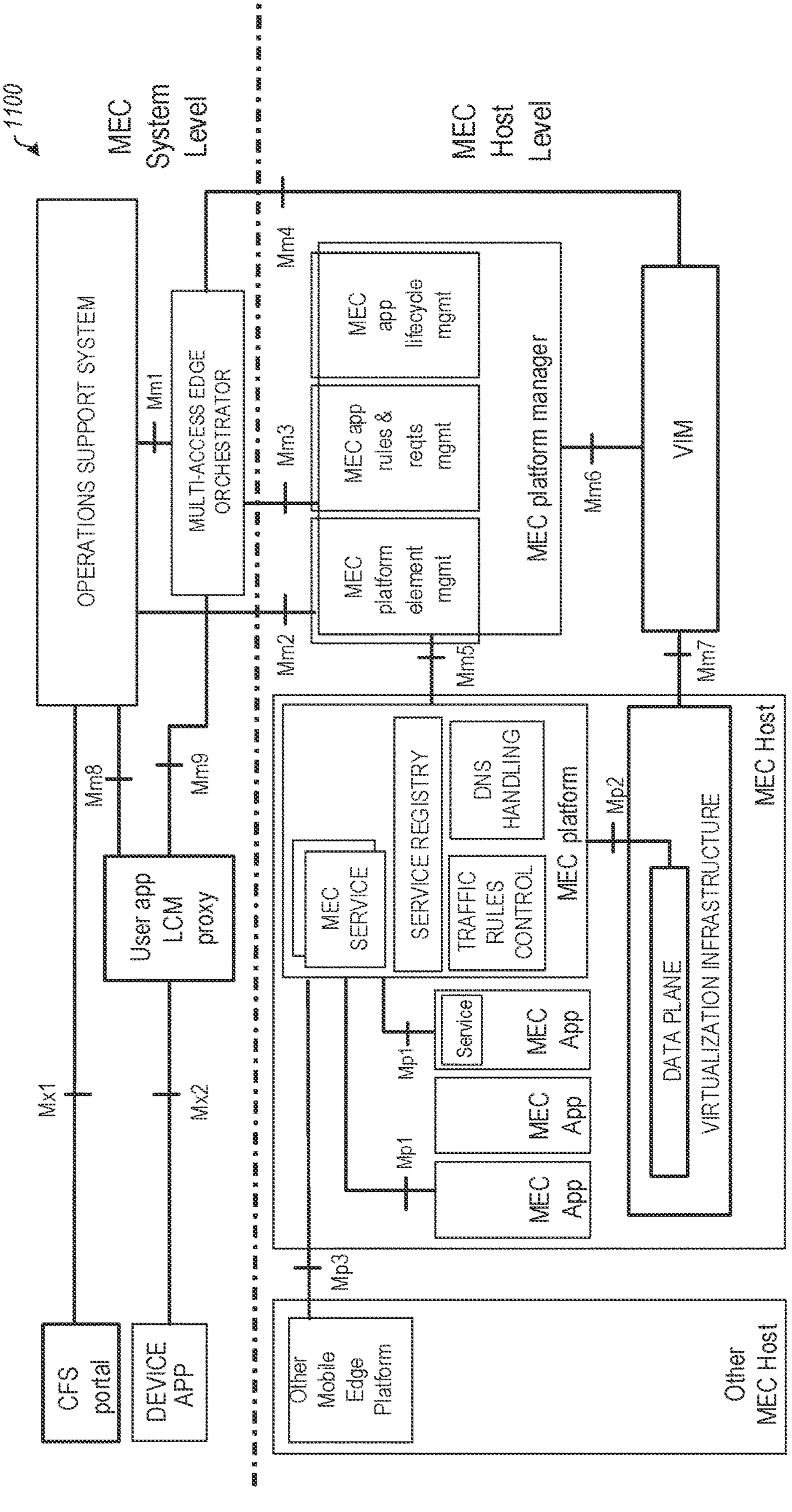
FIG. 11 illustrates an example MEC system and MEC host architecture, according to an example.

FIG. 11 depicts a block diagram for an example MEC system architecture in which any one or more of the techniques (e.g., operations, processes, methods, and methodologies) discussed herein may be performed. In an example, the MEC system architecture may be defined according to a specification, standard, or other definition (e.g., according to the ETSI GS MEC 003 specification). In this diagram, Mp reference points refer to MEC platform functionality; Mm reference points refer to management; and Mx refers to connections to external entities. The services, applications, orchestrators, and other entities discussed herein (e.g., in FIGS. 3 to 10) may be implemented at any number of the entities of the MEC system architecture depicted in FIG. 11, and the communications to perform network operations may be implemented at any number of the interfaces of the MEC system architecture depicted in FIG. 11.

Figure 12:
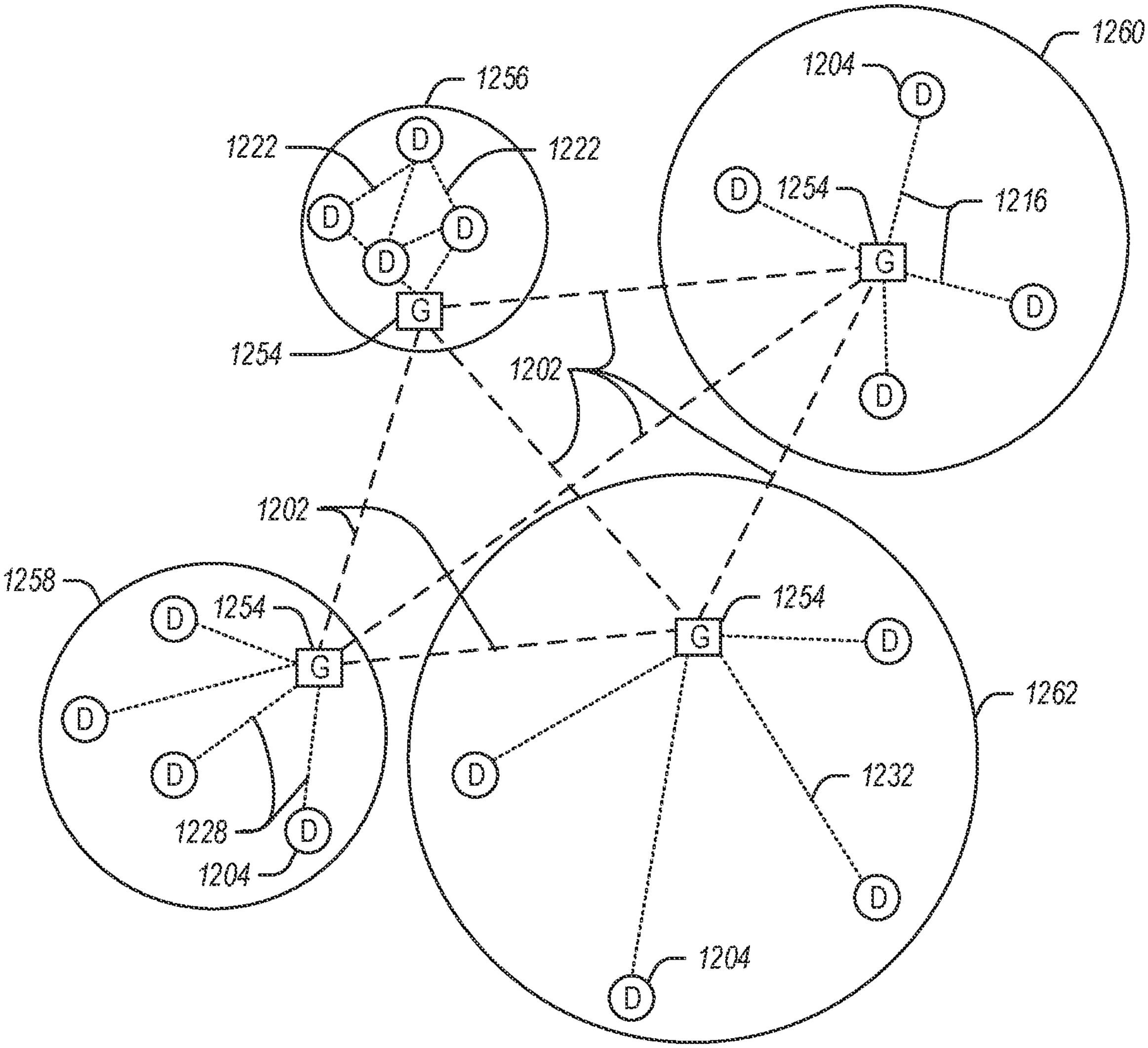
FIG. 12 illustrates a domain topology for respective internet-of-things (IoT) networks coupled through links to respective gateways, according to an example.

FIG. 12 illustrates an example domain topology for respective IoT networks coupled through links to respective gateways. The IoT is a concept in which a large number of computing devices are interconnected to each other and to the Internet to provide functionality and data acquisition at very low levels. Thus, as used herein, an IoT device may include a semiautonomous device (e.g., a client edge device, as discussed in the examples above) performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as with the configurations referenced in FIGS. 12 to 15, present a number of new challenges in a heterogeneous network of connectivity comprising a combination of wired and wireless technologies.

FIG. 12 specifically provides a simplified drawing of a domain topology that may be used for a number of internet-of-things (IoT) networks comprising IoT devices 1204, with the IoT networks 1256, 1258, 1260, 1262, coupled through backbone links 1202 to respective gateways 1254. For example, a number of IoT devices 1204 may communicate with a gateway 1254, and with each other through the gateway 1254. To simplify the drawing, not every IoT device 1204, or communications link (e.g., link 1216, 1222, 1228, or 1232) is labeled. The backbone links 1202 may include any number of wired or wireless technologies, including optical networks, and may be part of a local area network (LAN), a wide area network (WAN), or the Internet. Additionally, such communication links facilitate optical signal paths among both IoT devices 1204 and gateways 1254, including the use of MUXing/deMUXing components that facilitate interconnection of the various devices.

The network topology may include any number of types of IoT networks, such as a mesh network provided with the network 1256 using Bluetooth low energy (BLE) links 1222. Other types of IoT networks that may be present include a wireless local area network (WLAN) network 1258 used to communicate with IoT devices 1204 through IEEE 802.11 (Wi-Fi®) links 1228, a cellular network 1260 used to communicate with IoT devices 1204 through an LTE/LTE-A (4G) or 5G cellular network, and a low-power wide area (LPWA) network 1262, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 1204, such as over the backbone links 1202, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 1256, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 1258, for instance, may use systems that perform standards conversion to provide multi-standard connectivity, enabling IoT devices 1204 using different protocols to communicate. Further systems may provide seamless interconnectivity across a multi-standard infrastructure comprising visible Internet resources and hidden Internet resources.

Communications in the cellular network 1260, for instance, may be enhanced by systems that offload data, extend communications to more remote devices, or both. The LPWA network 1262 may include systems that perform non-Internet protocol (IP) to IP interconnections, addressing, and routing. Further, each of the IoT devices 1204 may include the appropriate transceiver for wide area communications with that device. Further, each IoT device 1204 may include other transceivers for communications using additional protocols and frequencies. This is discussed further with respect to the communication environment and hardware of an IoT processing device depicted in FIGS. 14 and 15.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 13 below.

Figure 13:
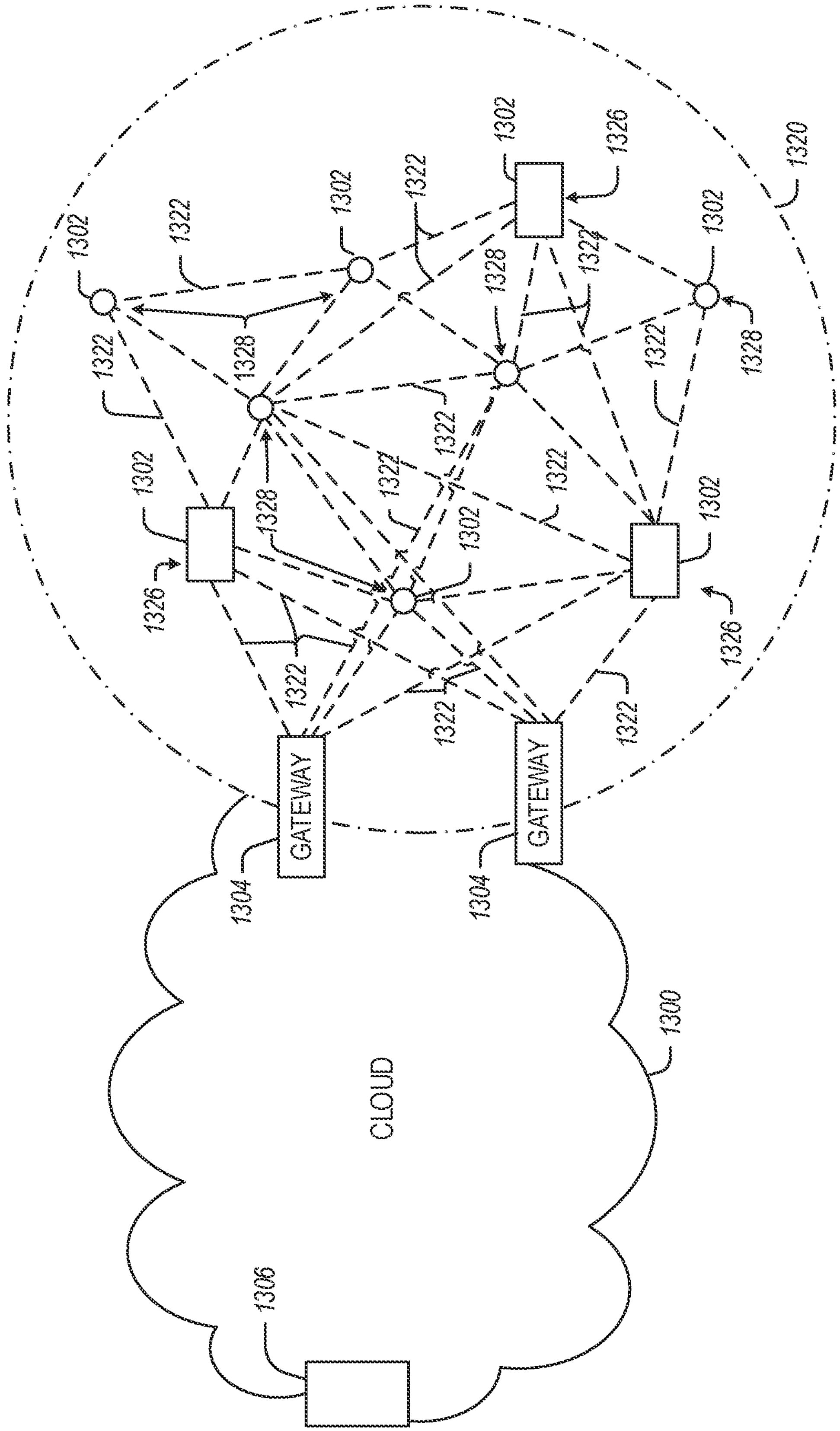
FIG. 13 illustrates a cloud computing network in communication with a mesh network of IoT devices operating as a fog device at the edge of the cloud computing network, according to an example.

FIG. 13 illustrates a cloud computing network in communication with a mesh network of IoT devices (devices 1302) operating as a fog device at the edge of the cloud computing network. The mesh network of IoT devices may be termed a fog 1320, operating at the edge of the cloud 1300. To simplify the diagram, not every IoT device 1302 is labeled.

The fog 1320 may be considered to be a massively interconnected network wherein a number of IoT devices 1302 are in communications with each other, for example, by radio links 1322. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 1302 are shown in this example, gateways 1304, data aggregators 1326, and sensors 1328, although any combinations of IoT devices 1302 and functionality may be used. The gateways 1304 may be edge devices that provide communications between the cloud 1300 and the fog 1320, and may also provide the backend process function for data obtained from sensors 1328, such as motion data, flow data, temperature data, and the like. The data aggregators 1326 may collect data from any number of the sensors 1328, and perform the back end processing function for the analysis. The results, raw data, or both may be passed along to the cloud 1300 through the gateways 1304. The sensors 1328 may be full IoT devices 1302, for example, capable of both collecting data and processing the data. In some cases, the sensors 1328 may be more limited in functionality, for example, collecting the data and allowing the data aggregators 1326 or gateways 1304 to process the data.

Communications from any IoT device 1302 may be passed along a convenient path (e.g., a most convenient path) between any of the IoT devices 1302 to reach the gateways 1304. In these networks, the number of interconnections provide substantial redundancy, allowing communications to be maintained, even with the loss of a number of IoT devices 1302. Further, the use of a mesh network may allow IoT devices 1302 that are very low power or located at a distance from infrastructure to be used, as the range to connect to another IoT device 1302 may be much less than the range to connect to the gateways 1304.

The fog 1320 provided from these IoT devices 1302 may be presented to devices in the cloud 1300, such as a server 1306, as a single device located at the edge of the cloud 1300, e.g., a fog device. In this example, the alerts coming from the fog device may be sent without being identified as coming from a specific IoT device 1302 within the fog 1320. In this fashion, the fog 1320 may be considered a distributed platform that provides computing and storage resources to perform processing or data-intensive tasks such as data analytics, data aggregation, and machine-learning, among others.

In some examples, the IoT devices 1302 may be configured using an imperative programming style, e.g., with each IoT device 1302 having a specific function and communication partners. However, the IoT devices 1302 forming the fog device may be configured in a declarative programming style, allowing the IoT devices 1302 to reconfigure their operations and communications, such as to determine needed resources in response to conditions, queries, and device failures. As an example, a query from a user located at a server 1306 about the operations of a subset of equipment monitored by the IoT devices 1302 may result in the fog 1320 device selecting the IoT devices 1302, such as particular sensors 1328, needed to answer the query. The data from these sensors 1328 may then be aggregated and analyzed by any combination of the sensors 1328, data aggregators 1326, or gateways 1304, before being sent on by the fog 1320 device to the server 1306 to answer the query. In this example, IoT devices 1302 in the fog 1320 may select the sensors 1328 used based on the query, such as adding data from flow sensors or temperature sensors. Further, if some of the IoT devices 1302 are not operational, other IoT devices 1302 in the fog 1320 device may provide analogous data, if available.

In an example, the operations and functionality described above may be embodied by a device machine in the example form of an electronic processing system, within which a set or sequence of instructions may be executed to cause the electronic processing system to perform any one of the methodologies discussed herein, according to an example embodiment. The machine may be an edge device, IoT device, or an gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein.

Figure 14:
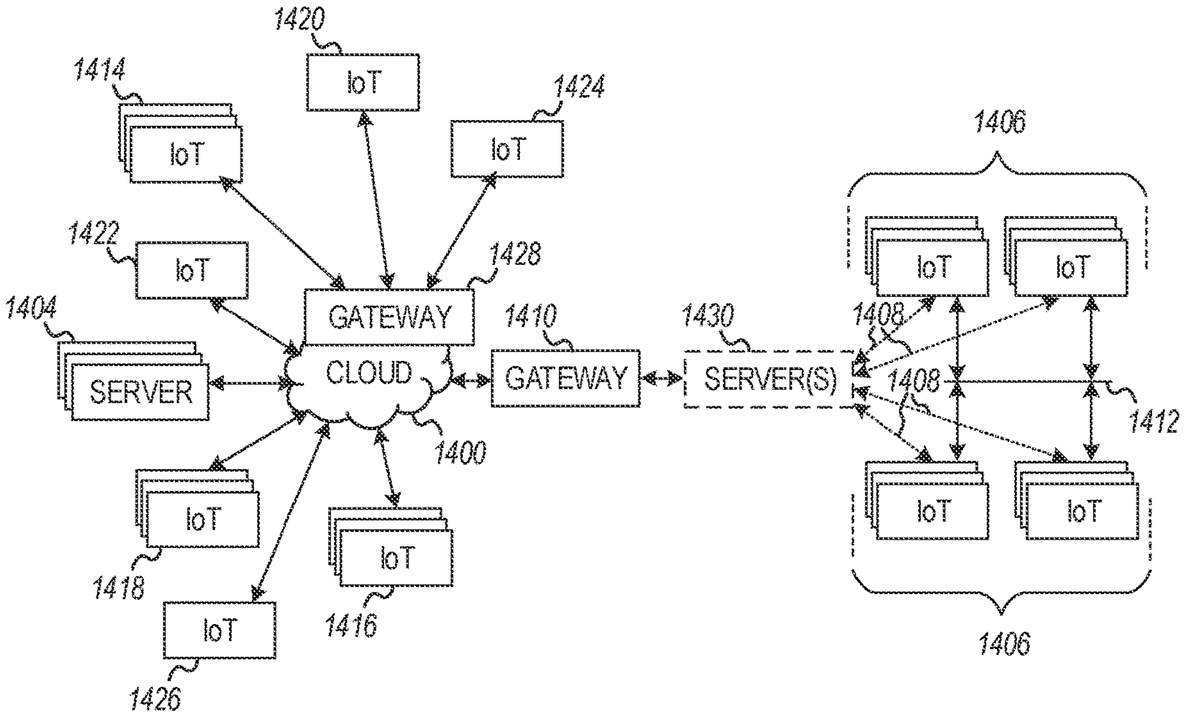
FIG. 14 illustrates a block diagram of a network illustrating communications among a number of IoT devices, according to an example.

FIG. 14 illustrates a drawing of a cloud computing network, or cloud 1400, in communication with a number of Internet of Things (IoT) devices. The cloud 1400 may represent the Internet, or may be a local area network (LAN), or a wide area network (WAN), such as a proprietary network for a company. The IoT devices may include any number of different types of devices, grouped in various combinations. For example, a traffic control group 1406 may include IoT devices along streets in a city. These IoT devices may include stoplights, traffic flow monitors, cameras, weather sensors, and the like. The traffic control group 1406, or other subgroups, may be in communication with the cloud 1400 through wired or wireless links 1408, such as LPWA links, optical links, and the like. Further, a wired or wireless sub-network 1412 may allow the IoT devices to communicate with each other, such as through a local area network, a wireless local area network, and the like. The IoT devices may use another device, such as a gateway 1410 or 1428 to communicate with remote locations such as the cloud 1400; the IoT devices may also use one or more servers 1430 to facilitate communication with the cloud 1400 or with the gateway 1410. For example, the one or more servers 1430 may operate as an intermediate network node to support a local edge cloud or fog implementation among a local area network. Further, the gateway 1428 that is depicted may operate in a cloud-to-gateway-to-many edge devices configuration, such as with the various IoT devices 1414, 1420, 1424 being constrained or dynamic to an assignment and use of resources in the cloud 1400.

Other example groups of IoT devices may include remote weather stations 1414, local information terminals 1416, alarm systems 1418, automated teller machines 1420, alarm panels 1422, or moving vehicles, such as emergency vehicles 1424 or other vehicles 1426, among many others. Each of these IoT devices may be in communication with other IoT devices, with servers 1404, with another IoT fog device or system (not shown, but depicted in FIG. 13), or a combination therein. The groups of IoT devices may be deployed in various residential, commercial, and industrial settings (including in both private or public environments).

As may be seen from FIG. 14, a large number of IoT devices may be communicating through the cloud 1400. This may allow different IoT devices to request or provide information to other devices autonomously. For example, a group of IoT devices (e.g., the traffic control group 1406) may request a current weather forecast from a group of remote weather stations 1414, which may provide the forecast without human intervention. Further, an emergency vehicle 1424 may be alerted by an automated teller machine 1420 that a burglary is in progress. As the emergency vehicle 1424 proceeds towards the automated teller machine 1420, it may access the traffic control group 1406 to request clearance to the location, for example, by lights turning red to block cross traffic at an intersection in sufficient time for the emergency vehicle 1424 to have unimpeded access to the intersection.

Clusters of IoT devices, such as the remote weather stations 1414 or the traffic control group 1406, may be equipped to communicate with other IoT devices as well as with the cloud 1400. This may allow the IoT devices to form an ad-hoc network between the devices, allowing them to function as a single device, which may be termed a fog device or system (e.g., as described above with reference to FIG. 13).

Figure 15:
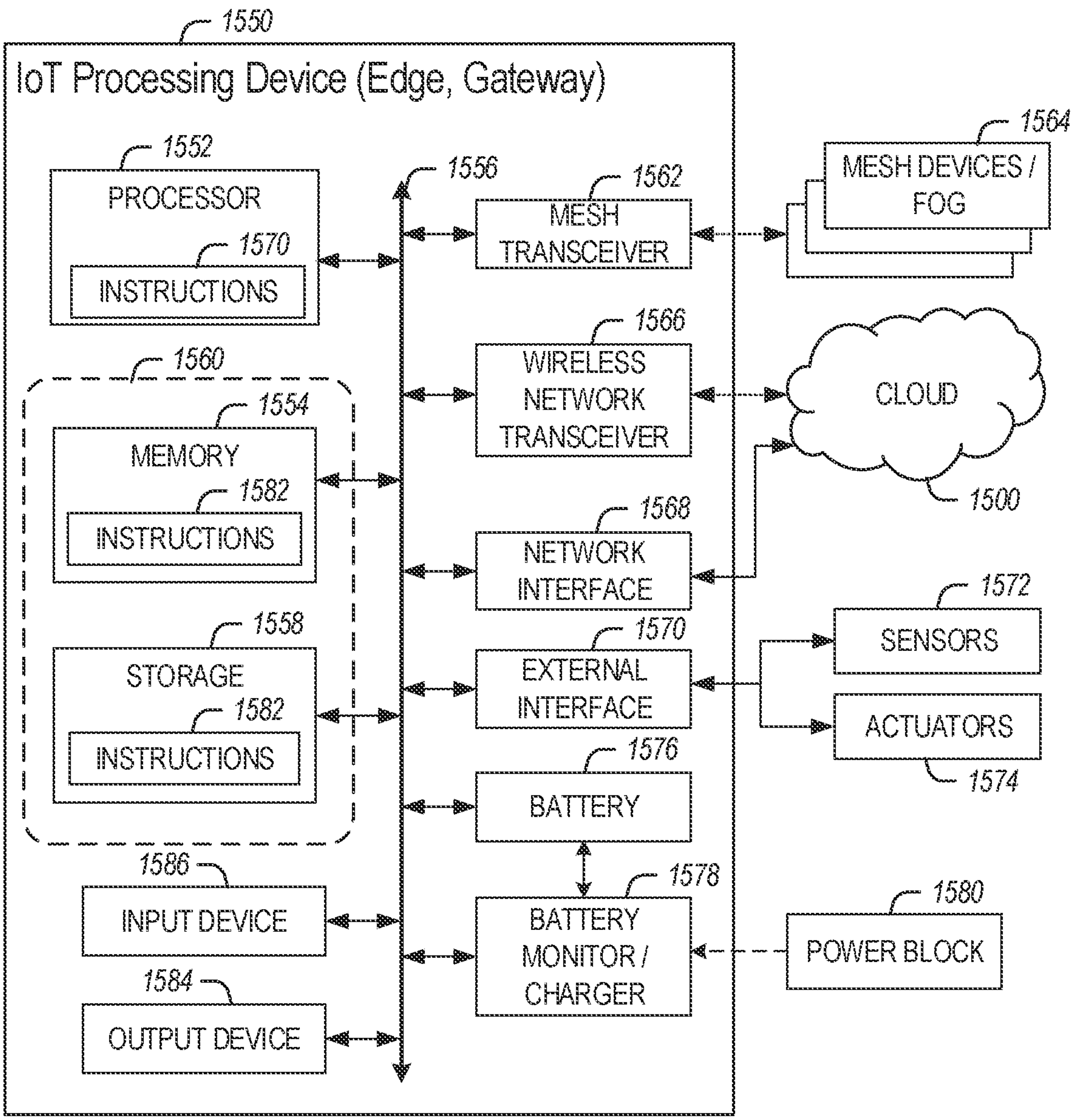
FIG. 15 illustrates a block diagram for an example IoT device processing system architecture upon which any one or more of the techniques (e.g., operations, processes, methods, and methodologies) discussed herein may be performed, according to an example.

FIG. 15 is a block diagram of an example of components that may be present in an IoT device 1550 (e.g., an edge device, or gateway device) for implementing the techniques described herein. The IoT device 1550 may include any combinations of the components shown in the example or referenced in the disclosure above. The components may be implemented as ICs, portions thereof, discrete electronic devices, or other modules, logic, hardware, software, firmware, or a combination thereof adapted in the IoT device 1550, or as components otherwise incorporated within a chassis of a larger system. Additionally, the block diagram of FIG. 15 is intended to depict a high-level view of components of the IoT device 1550. However, some of the components shown may be omitted, additional components may be present, and different arrangement of the components shown may occur in other implementations.

The IoT device 1550 may include a processor 1552, which may be a microprocessor, a multi-core processor, a multithreaded processor, an ultra-low voltage processor, an embedded processor, or other known processing element. The processor 1552 may be a part of a system on a chip (SoC) in which the processor 1552 and other components are formed into a single integrated circuit, or a single package, such as the Edison™ or Galileo™ SoC boards from Intel. As an example, the processor 1552 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A12 processor from Apple® Inc., a Snapdragon™ processor from Qualcomm® Technologies, Inc., or an OMAP™ processor from Texas Instruments, Inc.

The processor 1552 may communicate with a system memory 1554 over an interconnect 1556 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1558 may also couple to the processor 1552 via the interconnect 1556. In an example the storage 1558 may be implemented via a solid state disk drive (SSDD). Other devices that may be used for the storage 1558 include flash memory cards, such as SD cards, microSD cards, xD picture cards, and the like, and USB flash drives. In low power implementations, the storage 1558 may be on-die memory or registers associated with the processor 1552. However, in some examples, the storage 1558 may be implemented using a micro hard disk drive (HDD). Further, any number of new technologies may be used for the storage 1558 in addition to, or instead of, the technologies described, such resistance change memories, phase change memories, holographic memories, or chemical memories, among others.

The components may communicate over the interconnect 1556. The interconnect 1556 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1556 may be a proprietary bus, for example, used in a SoC based system. Other bus systems may be included, such as an I2C interface, an SPI interface, point to point interfaces, and a power bus, among others.

The interconnect 1556 may couple the processor 1552 to a mesh transceiver 1562, for communications with other mesh devices 1564. The mesh transceiver 1562 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 1564. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 1562 may communicate using multiple standards or radios for communications at different range. For example, the IoT device 1550 may communicate with close devices, e.g., within about 10 meters, using a local transceiver based on BLE, or another low power radio, to save power. More distant mesh devices 1564, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 1566 may be included to communicate with devices or services in the cloud 1500 via local or wide area network protocols. The wireless network transceiver 1566 may be a LPWA transceiver that follows the IEEE 802.15.4, or IEEE 802.15.4g standards, among others. The IoT device 1550 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 1562 and wireless network transceiver 1566, as described herein. For example, the radio transceivers 1562 and 1566 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 1562 and 1566 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It may be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 1566, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 1568 may be included to provide a wired communication to the cloud 1500 or to other devices, such as the mesh devices 1564. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 1568 may be included to allow connect to a second network, for example, a NIC 1568 providing communications to the cloud over Ethernet, and a second NIC 1568 providing communications to other devices over another type of network.

The interconnect 1556 may couple the processor 1552 to an external interface 1570 that is used to connect external devices or subsystems. The external devices may include sensors 1572, such as accelerometers, level sensors, flow sensors, optical light sensors, camera sensors, temperature sensors, a global positioning system (GPS) sensors, pressure sensors, barometric pressure sensors, and the like. The external interface 1570 further may be used to connect the IoT device 1550 to actuators 1574, such as power switches, valve actuators, an audible sound generator, a visual warning device, and the like.

In some optional examples, various input/output (I/O) devices may be present within, or connected to, the IoT device 1550. For example, a display or other output device 1584 may be included to show information, such as sensor readings or actuator position. An input device 1586, such as a touch screen or keypad may be included to accept input. An output device 1584 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 1550.

A battery 1576 may power the IoT device 1550, although in examples in which the IoT device 1550 is mounted in a fixed location, it may have a power supply coupled to an electrical grid. The battery 1576 may be a lithium ion battery, or a metal-air battery, such as a zinc-air battery, an aluminum-air battery, a lithium-air battery, and the like.

A battery monitor/charger 1578 may be included in the IoT device 1550 to track the state of charge (SoCh) of the battery 1576. The battery monitor/charger 1578 may be used to monitor other parameters of the battery 1576 to provide failure predictions, such as the state of health (SoH) and the state of function (SoF) of the battery 1576. The battery monitor/charger 1578 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 1578 may communicate the information on the battery 1576 to the processor 1552 over the interconnect 1556. The battery monitor/charger 1578 may also include an analog-to-digital (ADC) convertor that allows the processor 1552 to directly monitor the voltage of the battery 1576 or the current flow from the battery 1576. The battery parameters may be used to determine actions that the IoT device 1550 may perform, such as transmission frequency, mesh network operation, sensing frequency, and the like.

A power block 1580, or other power supply coupled to a grid, may be coupled with the battery monitor/charger 1578 to charge the battery 1576. In some examples, the power block 1580 may be replaced with a wireless power receiver to obtain the power wirelessly, for example, through a loop antenna in the IoT device 1550. A wireless battery charging circuit, such as an LTC4020 chip from Linear Technologies of Milpitas, Calif., among others, may be included in the battery monitor/charger 1578. The specific charging circuits chosen depend on the size of the battery 1576, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1558 may include instructions 1582 in the form of software, firmware, or hardware commands to implement the techniques described herein. Although such instructions 1582 are shown as code blocks included in the memory 1554 and the storage 1558, it may be understood that any of the code blocks may be replaced with hardwired circuits, for example, built into an application specific integrated circuit (ASIC).

In an example, the instructions 1582 provided via the memory 1554, the storage 1558, or the processor 1552 may be embodied as a non-transitory, machine readable medium 1560 including code to direct the processor 1552 to perform electronic operations in the IoT device 1550. The processor 1552 may access the non-transitory, machine readable medium 1560 over the interconnect 1556. For instance, the non-transitory, machine readable medium 1560 may be embodied by devices described for the storage 1558 of FIG. 15 or may include specific storage units such as optical disks, flash drives, or any number of other hardware devices. The non-transitory, machine readable medium 1560 may include instructions to direct the processor 1552 to perform a specific sequence or flow of actions, for example, as described with respect to the flowchart(s) and block diagram (s) of operations and functionality depicted above.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine readable medium may be provided by a storage device or other apparatus which is capable of hosting data in a non-transitory format. In an example, information stored or otherwise provided on a machine readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments are suggested according to the structures and techniques described above, and specified in the following examples and claims.

Example 1 is a computing device adapted for artificial intelligence (AI) model processing, the computing device comprising: communication circuitry to receive a request for an AI operation using an AI model; and processing circuitry configured to: process the request for the AI operation; identify, based on the request, an AI hardware platform for execution of an instance of the AI model; and cause execution of the AI model instance using the AI hardware platform.

In Example 2, the subject matter of Example 1 includes, subject matter where the request includes input data to be analyzed with the execution of the AI model instance, and wherein the execution of the AI model instance performs an inference operation with the AI model on the input data.

In Example 3, the subject matter of Examples 1-2 includes, subject matter where the request for the AI operation indicates service level agreement (SLA) information and cost information for execution of the instance of the AI model.

In Example 4, the subject matter of Examples 1-3 includes, subject matter where the request for the AI operation includes an identifier of the AI model, wherein the processing circuitry is further configured to obtain a binary for the AI model instance based on the identifier.

In Example 5, the subject matter of Example 4 includes, subject matter where the operations to obtain the binary include operations to retrieve the binary for the AI model instance from a data store, the data store hosting a plurality of AI model instances for a plurality of AI hardware platforms.

In Example 6, the subject matter of Examples 1-5 includes, subject matter where the request for the AI operation includes a description of the AI model, wherein the description of the AI model specifies a type of neural network, a type of structures used in the neural network, and weights applied in the neural network.

In Example 7, the subject matter of Examples 1-6 includes, subject matter where the request for the AI operation includes binary data for the AI model instance, and wherein the AI model instance is executed using the binary data.

In Example 8, the subject matter of Examples 1-7 includes, storage memory to store respective binary data for a plurality of AI models, including a binary used for execution with the AI model instance.

In Example 9, the subject matter of Examples 1-8 includes, subject matter where the request for the AI operation includes an indication of an accelerator type, and wherein the accelerator type corresponds to a type of AI hardware platform from among a plurality of platform types.

In Example 10, the subject matter of Examples 1-9 includes, subject matter where the computing device is implemented as an edge gateway or edge switch within an edge computing platform, and wherein the AI hardware platform comprises an accelerator operable as one of a plurality of hardware accelerators within the edge computing platform.

In Example 11, the subject matter of Example 10 includes, subject matter where the plurality of hardware accelerators comprises hardware designated to perform AI operations, the hardware selected from among: field programmable gate array (FPGA) units, neural processing units, neural compute sticks, application-specific integrated circuit (ASIC) units, graphical processing unit (GPU) arrays, vision processing units, or neuromorphic hardware units.

In Example 12, the subject matter of Examples 10-11 includes, subject matter where the request for the AI operation is received from an edge device communicatively coupled to the edge computing platform, wherein the operations performed by the processing circuitry further include operations to: communicate, to the edge device, results of the execution produced from the AI model instance.

Example 13 is a method for artificial intelligence (AI) model processing with an AI hardware platform, the method comprising a plurality of operations executed with at least one processor and memory of a computing device, and the operations comprising: obtaining a request for an AI operation using an AI model; identifying, based on the request, an AI hardware platform for execution of an instance of the AI model; and causing execution of the AI model instance using the AI hardware platform.

In Example 14, the subject matter of Example 13 includes, subject matter where the request includes input data to be analyzed with the execution of the AI model instance, and wherein the execution of the AI model instance performs an inference operation with the AI model on the input data.

In Example 15, the subject matter of Examples 13-14 includes, subject matter where the request for the AI operation indicates service level agreement (SLA) information and cost information for execution of the instance of the AI model.

In Example 16, the subject matter of Examples 13-15 includes, subject matter where the request for the AI operation includes an identifier of the AI model, wherein the processing circuitry is further configured to obtain a binary for the AI model instance based on the identifier.

In Example 17, the subject matter of Example 16 includes, subject matter where the operations to obtain the binary include operations to retrieve the binary for the AI model instance from a data store, the data store hosting a plurality of AI model instances for a plurality of AI hardware platforms.

In Example 18, the subject matter of Examples 13-17 includes, subject matter where the request for the AI operation includes a description of the AI model, wherein the description of the AI model specifies a type of neural network, a type of structures used in the neural network, and weights applied in the neural network.

In Example 19, the subject matter of Examples 13-18 includes, subject matter where the request for the AI operation includes binary data for the AI model instance, and wherein the AI model instance is executed using the binary data.

In Example 20, the subject matter of Examples 13-19 includes, accessing a data store, the data store providing respective binary data for a plurality of AI models, including a binary used for execution with the AI model instance.

In Example 21, the subject matter of Examples 13-20 includes, subject matter where the request for the AI operation includes an indication of an accelerator type, and wherein the accelerator type corresponds to a type of AI hardware platform from among a plurality of platform types.

In Example 22, the subject matter of Examples 13-21 includes, subject matter where the computing device is implemented as an edge gateway or edge switch within an edge computing platform, and wherein the AI hardware platform comprises an accelerator operable as one of a plurality of hardware accelerators within the edge computing platform.

In Example 23, the subject matter of Example 22 includes, subject matter where the plurality of hardware accelerators comprises hardware designated to perform AI operations, the hardware selected from among: field programmable gate array (FPGA) units, neural processing units, application-specific integrated circuit (ASIC) units, neural compute sticks, a vision processing unit, a graphics processing unit (GPU) array, or neuromorphic hardware units.

In Example 24, the subject matter of Examples 22-23 includes, subject matter where the request for the AI operation is received from an edge device communicatively coupled to the edge computing platform, the operations further comprising: communicating, to the edge device, results of the execution produced from the AI model instance.

Example 25 is at least one machine-readable storage medium including instructions, wherein the instructions, when executed by a processing circuitry of a computing device, cause the processing circuitry to perform operations of any of Examples 13 to 24.

Example 26 is at least one machine-readable storage medium, comprising a plurality of instructions adapted for artificial intelligence (AI) model processing with an AI hardware platform, wherein the instructions, responsive to being executed with processor circuitry of a computing machine, cause the processor circuitry to perform operations comprising: obtaining a request for an AI operation; identifying, based on the request, an AI hardware platform for execution of an instance of the AI model; and causing execution of the instance of the AI model using the AI hardware platform; wherein the computing device is implemented as an edge gateway or edge switch within an edge computing platform, and wherein the AI hardware platform comprises an accelerator operable as one of a plurality of hardware accelerators within the edge computing platform; and wherein the plurality of hardware accelerators comprises hardware designated to perform AI operations, the hardware selected from among: field programmable gate array (FPGA) units, neural processing units, application-specific integrated circuit (ASIC) units, or neuromorphic hardware units.

Example 27 is an apparatus, comprising: means for obtaining a request for an AI operation using an AI model; means for identifying, based on the request, an AI hardware platform for execution of an instance of the AI model; and means for causing execution of the AI model instance using the AI hardware platform.

In Example 28, the subject matter of Example 27 includes, subject matter where the request includes input data to be analyzed with the execution of the AI model instance, and wherein the execution of the AI model instance performs an inference operation with the AI model on the input data.

In Example 29, the subject matter of Examples 27-28 includes, subject matter where the request for the AI operation indicates service level agreement (SLA) information and cost information for execution of the instance of the AI model.

In Example 30, the subject matter of Examples 27-29 includes, subject matter where the request for the AI operation includes an identifier of the AI model, wherein the processing circuitry is further configured to obtain a binary for the AI model instance based on the identifier.

In Example 31, the subject matter of Example 30 includes, subject matter where the operations to obtain the binary include operations to retrieve the binary for the AI model instance from a data store, the data store hosting a plurality of AI model instances for a plurality of AI hardware platforms.

In Example 32, the subject matter of Examples 27-31 includes, subject matter where the request for the AI operation includes a description of the AI model, wherein the description of the AI model specifies a type of neural network, a type of structures used in the neural network, and weights applied in the neural network.

In Example 33, the subject matter of Examples 27-32 includes, subject matter where the request for the AI operation includes binary data for the AI model instance, and wherein the AI model instance is executed using the binary data.

In Example 34, the subject matter of Examples 27-33 includes, means for accessing a data store, the data store providing respective binary data for a plurality of AI models, including a binary used for execution with the AI model instance.

In Example 35, the subject matter of Examples 27-34 includes, subject matter where the request for the AI operation includes an indication of an accelerator type, and wherein the accelerator type corresponds to a type of AI hardware platform from among a plurality of platform types.

In Example 36, the subject matter of Examples 27-35 includes, subject matter where the computing device is implemented as an edge gateway or edge switch within an edge computing platform, and wherein the AI hardware platform comprises an accelerator operable as one of a plurality of hardware accelerators within the edge computing platform.

In Example 37, the subject matter of Example 36 includes, subject matter where the plurality of hardware accelerators comprises hardware designated to perform AI operations, the hardware selected from among: field programmable gate array (FPGA) units, neural processing units, a neural compute stick, a vision processing unit, a graphics processing unit (GPU) array, application-specific integrated circuit (ASIC) units, or neuromorphic hardware units.

In Example 38, the subject matter of Examples 36-37 includes, subject matter where the request for the AI operation is received from an edge device communicatively coupled to the edge computing platform, the operations further comprising: communicating, to the edge device, results of the execution produced from the AI model instance.

Example 39 is an apparatus comprising means to perform one or more elements of a method described in or related to any of Examples 13-26, or any other method or process described herein.

Example 40 is at least one machine-readable storage medium, comprising information representative of instructions that, when executed by processing circuitry, cause the processing circuitry to, perform the operations of any of Examples 1-39, or any other method or process described herein.

Example 41 is one or more non-transitory computer-readable media comprising instructions to cause an electronic device, upon execution of the instructions by one or more processors of the electronic device, to perform one or more elements of a method described in or related to any of Examples 1-39, or any other method or process described herein.

Example 42 is an apparatus comprising logic, modules, or circuitry to perform one or more elements of a method described in or related to any of Examples 1-39, or any other method or process described herein.

Example 43 is a method, technique, or process as described in or related to any of Examples 1-39.

Example 44 is an apparatus comprising: one or more processors and one or more computer readable media comprising instructions that, when executed by the one or more processors, cause the one or more processors to perform the method, techniques, or process as described in or related to any of Examples 1-38.

Example 45 is a signal as described in or related to any of Examples 1-39.

Example 46 is a signal in a wireless network as described in or related to any of Examples 1-39.

Example 47 is a method of coordinating communications in a wireless network as described in or related to any of Examples 1-38.

Example 48 is a device for processing communication as described in or related to any of Examples 1-39.

Example 49 is a network comprising respective devices and device communication mediums for performing any of the operations of Examples 1-39.

Example 50 is an edge cloud computing device implementation comprising processing nodes and computing units adapted for performing any of the operations of Examples 1-39.

Example 51 is an ETSI MEC system implementation comprising devices, processing nodes, and computing units adapted for performing any of the operations of Examples 1-39.

Example 52 is a MEC system implementation, including respective MEC entities including MEC hosts, MEC platforms, and orchestrator, adapted for performing any of the operations of Examples 1-39.

Example 52 is an Internet of Things (IoT) system implementation, including respective endpoint devices, intermediate nodes, and processing resources, adapted for performing any of the operations of Examples 1-39.

Example 53 is an edge cloud network platform comprising physical and logical computing resources adapted for performing any of the operations of Examples 1-39.

Example 54 is an apparatus comprising respective means for performing any of the operations of Examples 1-53.

Example 55 is a system to perform the operations of any of Examples 1-53.

In the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. A computing device to implement an inferencing-as-a-service deployment in a communication network, the computing device comprising:
- a network interface card (NIC); and
- processing circuitry coupled to the NIC, the processing circuitry configured to:
  - access a plurality of artificial intelligence (AI) models and metadata information of the AI models;
  - decode a query for an AI workload received via the NIC, the query associated with input data;
  - select an AI model of the plurality of AI models based on the query and the metadata information;
  - decode the query to access a binary for an instance of the AI model of the plurality of AI models;
  - select a hardware accelerator from a plurality of hardware accelerators based on the query, the hardware accelerator being configurable to be in multiple hardware platforms and/or multiple appliances; and
  - cause execution of the binary for the instance of the AI model using the hardware accelerator to process the input data.

2. The computing device of claim 1, wherein the processing circuitry is further to:
- decode the query to obtain a description of the AI model, wherein the description of the AI model specifies a type of neural network used by the AI model, a type of structures used in the neural network, and weights applied in the neural network after the AI model is trained.

3. The computing device of claim 2, wherein the processing circuitry is further to:
- select the AI model from the plurality of AI models based on matching the description of the AI model with the metadata information of the AI models.

4. The computing device of claim 1, wherein the processing circuitry is further to:

decode the query to further obtain service level agreement (SLA) information, the SLA information specifying at least one input parameter for the execution of the binary.

5. The computing device of claim 4, wherein the processing circuitry is further to:

select the hardware accelerator from the plurality of hardware accelerators based on the SLA information.

6. The computing device of claim 1, wherein the processing circuitry is further to:

decode the query to further obtain quality of service (QOS) information; and select the hardware accelerator from the plurality of hardware accelerators based on the QoS information.

7. The computing device of claim 1, wherein the processing circuitry is further to:

decode the query to further obtain an identifier of the AI model; and select the binary for the instance of the AI model based on the identifier.

8. The computing device of claim 7, wherein the processing circuitry is further to:

retrieve the binary for the instance of the AI model from a data store, the data store hosting a plurality of AI model instances for the plurality of hardware accelerators.

9. The computing device of claim 1, wherein the execution of the binary for the instance of the AI model performs an inference operation with the AI model on the input data.

10. At least one non-transitory machine-readable storage medium comprising instructions stored thereupon, which when executed by processing circuitry of a computing node operable to implement an inferencing-as-a-service deployment in a communication network, cause the processing circuitry to perform operations comprising:

accessing a plurality of artificial intelligence (AI) models and metadata information of the AI models;

decoding a query for an AI workload, the query associated with input data;

selecting an AI model of the plurality of AI models based on the query and the metadata information;

decoding the query to access a binary for an instance of the AI model of the plurality of AI models;

selecting a hardware accelerator from a plurality of hardware accelerators based on the query, the hardware accelerator being configurable to be in multiple hardware platforms and/or multiple appliances; and causing execution of the binary for the instance of the AI model using the hardware accelerator to process the input data.

11. The at least one non-transitory machine-readable storage medium of claim 10, the operations further comprising:

decoding the query to obtain a description of the AI model, wherein the description of the AI model specifies a type of neural network used by the AI model, a type of structures used in the neural network, and weights applied in the neural network after the AI model is trained.

12. The at least one non-transitory machine-readable storage medium of claim 11, the operations further comprising:

selecting the AI model from the plurality of AI models based on matching the description of the AI model with the metadata information of the AI models.

13. The at least one non-transitory machine-readable storage medium of claim 10, the operations further comprising:

decoding the query to further obtain service level agreement (SLA) information, the SLA information specifying at least one input parameter for the execution of the binary.

14. The at least one non-transitory machine-readable storage medium of claim 13, the operations further comprising:

selecting the hardware accelerator from the plurality of hardware accelerators based on the SLA information.

15. The at least one non-transitory machine-readable storage medium of claim 10, the operations further comprising:

decoding the query to further obtain quality of service (QOS) information; and selecting the hardware accelerator from the plurality of hardware accelerators based on the QoS information.

16. The at least one non-transitory machine-readable storage medium of claim 10, the operations further comprising:

decoding the query to further obtain an identifier of the AI model; and selecting the binary for the instance of the AI model based on the identifier.

17. The at least one non-transitory machine-readable storage medium of claim 16, the operations further comprising:

retrieving the binary for the instance of the AI model from a data store, the data store hosting a plurality of AI model instances for the plurality of hardware accelerators.

18. The at least one non-transitory machine-readable storage medium of claim 10, wherein the execution of the binary for the instance of the AI model includes performing an inference operation with the AI model on the input data.

19. A method comprising:

performing by at least one hardware processor:

accessing a plurality of artificial intelligence (AI) models and metadata information of the AI models;

decoding a query for an AI workload, the query associated with input data;

selecting an AI model of the plurality of AI models based on the query and the metadata information;

decoding the query to access a binary for an instance of the AI model of the plurality of AI models;

selecting a hardware accelerator from a plurality of hardware accelerators based on the query, the hardware accelerator being configurable to be in multiple hardware platforms and/or multiple appliances; and causing execution of the binary for the instance of the AI model using the hardware accelerator to process the input data.

20. The method of claim 19, further comprising:

decoding the query to obtain a description of the AI model, wherein the description of the AI model specifies a type of neural network used by the AI model, a type of structures used in the neural network, and weights applied in the neural network after the AI model is trained.

21. The method of claim 20, further comprising:

selecting the AI model from the plurality of AI models based on matching the description of the AI model with the metadata information of the AI models.

22. The method of claim 19, further comprising: decoding the query to further obtain service level agreement (SLA) information, the SLA information specifying at least one input parameter for the execution of the binary.

23. The method of claim 22, further comprising: selecting the hardware accelerator from the plurality of hardware accelerators based on the SLA information.

* * * * *